(12) United States Patent
Tong et al.

(10) Patent No.: US 9,538,519 B2
(45) Date of Patent: Jan. 3, 2017

(54) WIRELESS COMMUNICATION METHOD OF SIGNALING COMP STATES, AND TRANSMISSION POINT AND USER EQUIPMENT THEREFOR

(71) Applicant: Panasonic Intellectual Property Corporation of America, Torrance, CA (US)

(72) Inventors: Hui Tong, Beijing (CN); Masayuki Hoshino, Kanagawa (JP); Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/426,667

(22) PCT Filed: Sep. 25, 2012

(86) PCT No.: PCT/CN2012/081936
§ 371 (c)(1),
(2) Date: Mar. 6, 2015

(87) PCT Pub. No.: WO2014/047785
PCT Pub. Date: Apr. 3, 2014

(65) Prior Publication Data
US 2015/0230214 A1    Aug. 13, 2015

(51) Int. Cl.
*H04W 28/06*    (2009.01)
*H04W 72/04*    (2009.01)
(Continued)

(52) U.S. Cl.
CPC ........... *H04W 72/042* (2013.01); *H04B 7/024* (2013.01); *H04L 1/1861* (2013.01); *H04W 28/06* (2013.01)

(58) Field of Classification Search
None
See application file for complete search history.

(56) References Cited

U.S. PATENT DOCUMENTS 8,270,359 B2    9/2012    Nangia et al.
8,270,539 B2    9/2012    Shoarinejad et al.
(Continued)

FOREIGN PATENT DOCUMENTS

| CN | 101764642 A | 6/2010 |
|---|---|---|
| CN | 102315870 A | 1/2012 |
| EP | 2 485 538 A1 | 8/2012 |

OTHER PUBLICATIONS

3GPP TS 36.212 V10.5.0, "$3^{rd}$ Generation Partnership Project; Technical Specification Group Radio Access Network; Evolved Universal Terrestrial Radio Access (E-UTRA); Multiplexing and channel coding (Release 10)," Mar. 2012, 80 pages.

(Continued)

*Primary Examiner* — Ayaz Sheikh
*Assistant Examiner* — Tarell Hampton
(74) *Attorney, Agent, or Firm* — Seed IP Law Group LLP

(57) ABSTRACT

The wireless communication comprises: transmitting downlink control information (DCI) from a transmission point to an UE for the enabled TB and the disabled TB, wherein the DCI comprises a 8-value indicator to indicate CoMP states for the enabled TB in conjunction with the new data indicator (NDI) of the disabled TB; if the NDI of the enabled TB is untoggled or the value of the 8-value indicator for the enabled TB is equal to 0, 1, 2, or 3, the UE using the NDI of the disabled TB to select a CoMP state from a first CoMP state and a second CoMP state; and if the NDI of the enabled TB is toggled and the value of the 8-value indicator is 4, 5, 6, or 7, the UE obtaining the information of whether the enabled TB is initial transmission or retransmission based on the NDI of the disabled TB.

14 Claims, 12 Drawing Sheets

(51) Int. Cl.
  *H04B 7/02*    (2006.01)
  *H04L 1/18*    (2006.01)

(56) References Cited

U.S. PATENT DOCUMENTS

| | | |
|---|---|---|
| 8,731,088 B2 | 5/2014 | Ko et al. |
| 2011/0019776 A1 | 1/2011 | Zhang et al. |
| 2011/0035639 A1* | 2/2011 | Earnshaw ............. H04L 1/1812 |
| | | 714/748 |
| 2011/0170498 A1 | 7/2011 | Liu et al. |
| 2011/0194536 A1 | 8/2011 | Kim et al. |
| 2011/0222485 A1* | 9/2011 | Nangia ................ H04B 7/0452 |
| | | 370/329 |
| 2012/0106610 A1* | 5/2012 | Nogami ................ H04B 7/024 |
| | | 375/224 |
| 2012/0113951 A1* | 5/2012 | Koo ...................... H04L 5/0048 |
| | | 370/329 |
| 2012/0188978 A1 | 7/2012 | Yan et al. |

OTHER PUBLICATIONS

Extended European Search Report, dated Feb. 19, 2016, for corresponding EP Application No. 12885654.9-1874 / 2901567, 12 pages.
New Postcom, "Downlink control signaling for CoMP," R1-123435, 3GPP TSG RAN WG1 Meeting #70, Agenda Item: 7.5.4, Qingdao, China, Aug. 13-17, 2012, 4 pages.
International Search Report dated Mar. 28, 2013, for corresponding International Application No. PCT/CN2012/081936, 2 pages.
ZTE, "Downlink control signaling for CoMP," R1-123843, 3GPP TSG RAN WG1 Meeting #70, Agenda Item: 7.5.4, Qingdao, China, Aug. 13-17, 2012, 4 pages.

* cited by examiner configuring more CoMP states for
transmission with fewer layers than for
transmission with more layers          101
Fig.1
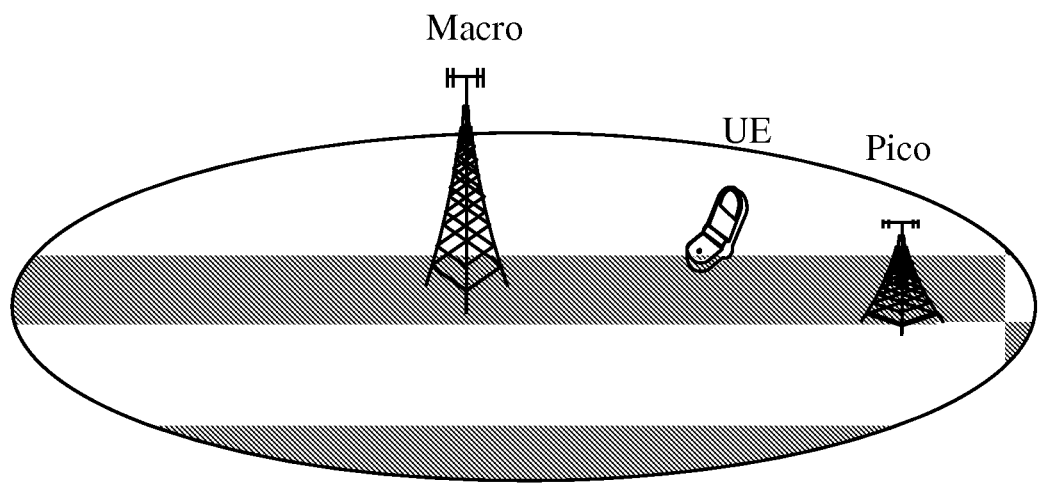
Fig.2
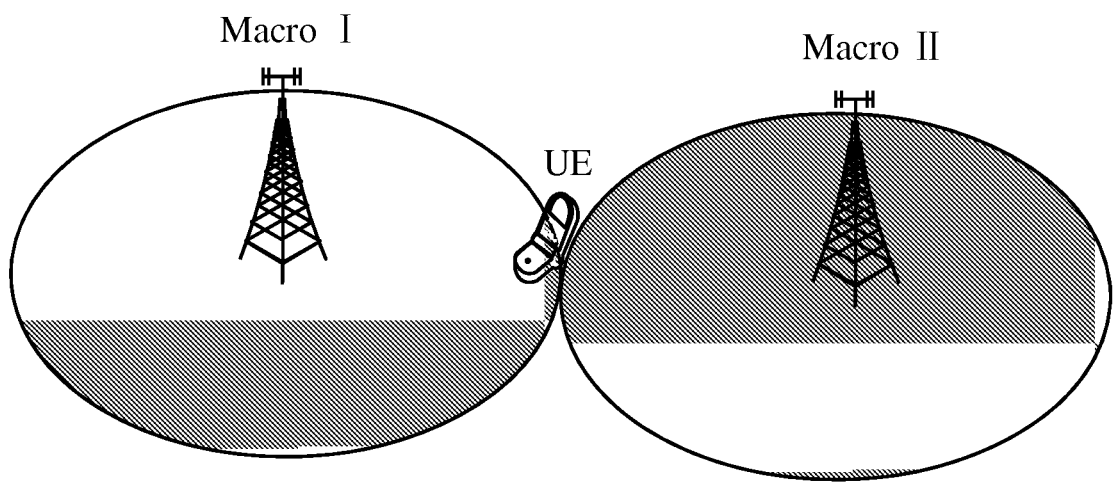
Fig.3

|  | NDI2=untoggled/0 | NDI2=toggled/1 |
|---|---|---|
| Single layer codepoints Value=0,1,2,3 | A | B |
| Single layer codepoints Value=4,5,6,7 | A | C |

Fig.8

```
transmitting a downlink control information (DCI)
from a transmission point (TP) to a user equipment
(UE) for the enabled TB and the disabled TB, wherein
the DCI comprises a 8-value indicator to indicate
demodulation reference signal (DMRS) antenna ports,
scrambling seeds, number of layers, and CoMP states
for the enabled TB in conjunction with the new data
indicator (NDI) of the disabled TB
```
901

```
if the value of the 8-value indicator for the enabled TB
is equal to 0, 1, 2, or 3, the UE using the NDI of the
disabled TB to select a CoMP state from a first CoMP
state and a second CoMP state
```
902

```
if the value of the 8-value indicator is 4, 5, 6, or 7 and
the NDI of the disabled TB is in a predetermined state,
the UE interpreting that a single layer and a third CoMP
state are configured for the enabled TB
```
903

Fig.9

WIRELESS COMMUNICATION METHOD OF SIGNALING COMP STATES, AND TRANSMISSION POINT AND USER EQUIPMENT THEREFOR

TECHNICAL FIELD

The present disclosure relates to a wireless communication method, a transmission point (TP) and a user equipment (UE), and in particular to a wireless communication method of signaling Coordinated Multipoint (CoMP) sates, and a TP and a UE therefor.

BACKGROUND

In the 3rd Generation Partnership Project (3GPP) RAN1 #70 in August 2012, it was agreed to introduce a new transmission mode (TM10) to Rel 11 of Long Term Evolution-Advanced (LTE-A). The purpose of introducing TM10 is to support CoMP operation, which needs to know additional information than single cell operation for UE demodulation process.

Those additional information that should be dynamically signaled (hence has to be in Downlink Control Information (DCI)) includes at least the Cell-specific Reference Signal (CRS) pattern that UE needs to rate match and the assumption of which Channel State Information-Reference Signal (CSI-RS) ports should be assumed to be quasi-colocated with Demodulation Reference Signal (DMRS) ports. There could be some other dynamic information such as Multicast-Broadcast Single Frequency Network (MBSFN) subframe configuration of each transmission point (TP), and zero power CSI-RS of each transmission point. However, this disclosure focuses on CRS pattern and antenna quasi-colocation because those two are the most agreeable dynamic signaling at this stage.

To reduce overhead, CRS pattern and antenna quasi-colocation should not be purely in DCI. Instead, several candidates of CRS pattern and antenna quasi-colocation are configured in Radio Resource Control (RRC). In DCI, UE may select among those candidates. Such method could maintain dynamic behavior while keeping lowest DCI overhead.

There are a couple of methods for higher layer (e.g. RRC or Medium Access Control (MAC)) signaling. One method is to have candidates jointly for CRS pattern and antenna quasi-colocation. For example, candidate A corresponds to {2 CRS ports and frequency shift 1, first CSI-RS is quasi-colocated with DMRS}, while candidate B corresponds to {4 CRS ports and frequency shift 0, second CSI-RS is quasi-colocated with DMRS}, etc. Those may be called as CoMP state (hereinafter also simply referred to as state) A and B, respectively.

Another higher layer signaling is to configure separate candidates for CRS pattern and antenna quasi-colocation. For example, three candidates for CRS patterns are {2 ports and shift 1, 4 ports and shift 0, 2 ports and shift 2}. The candidates for antenna quasi-colocation are {$1^{st}$ CSI-RS colocated, $2^{nd}$ CSI-RS colocated, $3^{rd}$ CSI-RS colocated}. UE may use separate DCI bits to select the candidates. However, the overhead may be concerned (at least 3 bits). A possible approach for this higher layer signaling is to define certain combination of CRS pattern and antenna quasi-colocation in specification, and use DCI to select among those combinations.

Both higher layer signaling design mentioned above are feasible. In this disclosure, we use the first signaling design as an example. But it should be understood that the spirit of the present disclosure can be simply extended to the second higher layer signaling design.

Although there are totally up to 12 possible states (4 CRS patterns, and 3 antenna quasi-colocations), 12 candidates in higher layer is not necessary because CRS pattern and antenna quasi-colocation are correlated, i.e., possibly a first CRS pattern would like to imply a first CSI-RS quasi-colocation. Therefore, in general 4 states are sufficient for most CoMP operations. The next question is which codepoints in DCI can be used to indicate those states.

In general it is preferred to keep DCI size small to avoid Physical Downlink Control Channel (PDCCH) capacity overload. This is especially true for CoMP operation because CoMP operation is more likely to be in cell edge (low Signal-to-Noise Ratio (SNR) region), where the DCI may take larger resources than cell center (or high SNR region).

In Rel-10 TM9, DCI 2C was introduced for single cell operation. In Rel-11 TM10, DCI 2D should be at least no larger than DCI 2C because TM10 is to support CoMP operation. Therefore, it is not preferred to add new bits in DCI which increase DCI size. It is also not preferred to use optional field in DCI 2C because it will increase DCI size as well.

Therefore, it is preferred to reuse/revise the existing codepoints in DCI 2C to signal CoMP states. In Rel-10 DCI 2C, the DMRS antenna ports, scrambling identity, and transmission rank (number of layers) are signaled in an 8-value indicator as in the following table:

TABLE 1

| Rel-10 DCI 2C design | | | |
|---|---|---|---|
| One Codeword:<br>Codeword 0 enabled,<br>Codeword 1 disabled | | Two Codewords:<br>Codeword 0 enabled,<br>Codeword 1 enabled | |
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

The two columns in table 1 are determined based on if two transport blocks (TB) are enabled or one TB is enabled, i.e. if two codewords are enabled or one codeword is enabled. If only one TB is enabled, left column is determined. If two TBs are enabled, right side column is determined.

The method to determine if a TB is disabled or enabled is based on the relevant Modulation and Coding Scheme (MCS) and Redundant Version (RV) of the TB. If $I_{MCS}$=0 and rvidx=1, then the corresponding TB is disabled. Otherwise the TB is enabled. If only one TB is enabled, the TB is mapped to CW1. If two TBs are enabled, TB1 and TB2 are mapped to CW1 and CW2 respectively.

Moreover, for value 4, 5, 6 of the 8-value indicator in the first column, they are used for retransmission of a TB if the TB is transmitted by 2, 3, 4 layers in the initial transmission, respectively.

SUMMARY OF THE DISCLOSURE

In view of the above, the present disclosure is made to indicate additional CoMP states in DCI while not increasing DCI size.

According to an embodiment of the present disclosure, there is provided a wireless communication method of signaling coordinated multipoint (CoMP) states with one transport block (TB) enabled and one TB disabled, comprising: transmitting a downlink control information (DCI) from a transmission point (TP) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB; if the NDI of the enabled TB is untoggled or the value of the 8-value indicator for the enabled TB is equal to 0, 1, 2, or 3, the UE using the NDI of the disabled TB to select a CoMP state from a first CoMP state and a second CoMP state; and if the NDI of the enabled TB is toggled and the value of the 8-value indicator is 4, 5, 6, or 7, the UE interpreting that a single layer and a third CoMP state are configured for the enabled TB, and obtaining the information of whether the enabled TB is initial transmission or retransmission based on the NDI of the disabled TB.

According to another embodiment of the present disclosure, there is provided a wireless communication method of signaling coordinated multipoint (CoMP) states with one transport block (TB) enabled and one TB disabled, comprising: transmitting a downlink control information (DCI) from a transmission point (TP) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB; if the value of the 8-value indicator for the enabled TB is equal to 0, 1, 2, or 3, the UE using the NDI of the disabled TB to select a CoMP state from a first CoMP state and a second CoMP state; and if the value of the 8-value indicator is 4, 5, 6, or 7 and the NDI of the disabled TB is in a predetermined state, the UE interpreting that a single layer and a third CoMP state are configured for the enabled TB.

According to yet another embodiment of the present disclosure, there is provided a wireless communication method of signaling coordinated multipoint (CoMP) states with both transport blocks (TB) enabled, comprising: transmitting a downlink control information (DCI) from a transmission point (TP) to a user equipment (UE), wherein the DCI comprises a 8-value indicator to indicate demodulation reference signal (DMRS) antenna ports, number of layers, and CoMP states; if the value of the 8-value indicator is equal to 0 or 1, the UE interpreting that 2 layers and ports 7-8 are configured, and if the value of the 8-value indicator is equal to 0, the UE selecting a first CoMP state from two CoMP states, otherwise if the value of the 8-value indicator is equal to 1, the UE selecting a second CoMP state from the two CoMP states; if the value of the 8-value indicator is equal to 2, the UE interpreting that 3 layers and ports 7-9 are configured; if the value of the 8-value indicator is equal to 3, the UE interpreting that 4 layers and ports 7-10 are configured; if the value of the 8-value indicator is equal to 4, the UE interpreting that 5 layers and ports 7-11 are configured; if the value of the 8-value indicator is equal to 5, the UE interpreting that 6 layers and ports 7-12 are configured; if the value of the 8-value indicator is equal to 6, the UE interpreting that 7 layers and ports 7-13 are configured; and if the value of the 8-value indicator is equal to 7, the UE interpreting that 8 layers and ports 7-14 are configured.

According to yet another embodiment of the present disclosure, there is provided a wireless communication method of signaling coordinated multipoint (CoMP) states with both transport blocks (TB) enabled, comprising: transmitting a downlink control information (DCI) from a transmission point (TP) to a user equipment (UE), wherein the DCI comprises a 8-value indicator to indicate demodulation reference signal (DMRS) antenna ports, scrambling identity, number of layers, and CoMP states; if the value of the 8-value indicator is equal to 0, 1, 2, or 3, the UE selecting a first CoMP state from two CoMP states; if the value of the 8-value indicator is equal to 4, 5, 6, 7, the UE selecting a second CoMP state from the two CoMP states; if the value of the 8-value indicator is equal to 0 or 4, the UE interpreting that 2 layers, ports 7-8 and $n_{SCID}=0$ are configured; if the value of the 8-value indicator is equal to 1 or 5, the UE interpreting that 2 layers, ports 7-8 and $n_{SCID}=1$ are configured; if the value of the 8-value indicator is equal to 2 or 6, the UE interpreting that 3 layers and ports 7-9 are configured; and if the value of the 8-value indicator is equal to 3 or 7, the UE interpreting that 4 layers and ports 7-10 are configured.

According to yet another embodiment of the present disclosure, there is provided a wireless communication method of signaling coordinated multipoint (CoMP) states with both transport blocks (TB) enabled, comprising: transmitting a downlink control information (DCI) from a transmission point (TP) to a user equipment (UE), wherein the DCI comprises a 8-value indicator to indicate demodulation reference signal (DMRS) antenna ports, number of layers, and CoMP states; if the value of the 8-value indicator is equal to 0, 1, 4 or 5, the UE interpreting that 2 layers and ports 7-8 are configured, and selecting a CoMP state from four CoMP states based on the value of the 8-value indicator; if the value of the 8-value indicator is equal to 2 or 6, the UE interpreting that 3 layers and ports 7-9 are configured, and selecting a CoMP state from two CoMP states based on the value of the 8-value indicator; and if the value of the 8-value indicator is equal to 3 or 7, the UE interpreting that 4 layers and ports 7-10 are configured, and selecting a CoMP state from the two CoMP states based on the value of the 8-value indicator.

According to yet another embodiment of the present disclosure, there is provided a wireless communication method of signaling coordinated multipoint (CoMP) states with both transport blocks (TB) enabled, comprising: transmitting a downlink control information (DCI) from a transmission point (TP) to a user equipment (UE), wherein the DCI comprises a 8-value indicator to indicate demodulation reference signal (DMRS) antenna ports, scrambling identity, number of layers, and CoMP states; if the value of the 8-value indicator is equal to 0, 4 or 6, the UE interpreting that 2 layers, ports 7-8 and $n_{SCID}=0$ are configured, and selecting a CoMP state from three CoMP states based on the value of the 8-value indicator; if the value of the 8-value indicator is equal to 1, 5 or 7, the UE interpreting that 2 layers, ports 7-8 and $n_{SCID}=1$ are configured, and selecting a CoMP state from the three CoMP states based on the value of the 8-value indicator; if the value of the 8-value indicator is equal to 2, the UE interpreting that 3 layers, and ports 7-9 are configured; and if the value of the 8-value indicator is equal to 3, the UE interpreting that 4 layers, and ports 7-10 are configured.

According to yet another embodiment of the present disclosure, there is provided a wireless communication method of signaling coordinated multipoint (CoMP) states with one transport block (TB) enabled and one TB disabled, comprising: transmitting downlink control information (DCI) from a transmission point (TP) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB; if the value of the 8-value indicator is equal to 0 or 4, the UE interpreting that 1 layer, port 7 and $n_{SCID}=0$ are configured for the enabled TB; if the value of the 8-value indicator is equal to 1 or 5, the UE interpreting that 1 layer, port 7 and $n_{SCID}=1$ are configured for the enabled TB; if the value of the 8-value indicator is equal to 2 or 6, the UE interpreting that 1 layer, port 8 and $n_{SCID}=0$ are configured for the enabled TB; if the value of the 8-value indicator is equal to 3, the UE interpreting that 1 layer, port 8 and $n_{SCID}=1$ are configured for the enabled TB; if the NDI of the disabled TB is in a predetermined state, then if the value of the 8-value indicator is equal to 0, 1, 2, or 3, the UE selecting a first CoMP state from four CoMP states, if the value of the 8-value indicator is equal to 4, 5, 6, or 7, the UE selecting a second CoMP state from the four CoMP states, and if the value of the 8-value indicator is equal to 7, the UE interpreting that 1 layer, port 8 and $n_{SCID}=1$ are configured for the enabled TB; and if the NDI of the disabled TB is not in the predetermined state, then if the value of the 8-value indicator is equal to 0, 1, 2, or 3, the UE selecting a third CoMP state from four CoMP states, and if the value of the 8-value indicator is equal to 4, 5, or 6, the UE selecting a fourth CoMP state from the four CoMP states.

According to yet another embodiment of the present disclosure, there is provided a wireless communication method of signaling coordinated multipoint (CoMP) states with both transport blocks (TB) enabled, comprising: transmitting a downlink control information (DCI) from a transmission point (TP) to a user equipment (UE), wherein the DCI comprises a 8-value indicator to indicate demodulation reference signal (DMRS) antenna ports, scrambling identity, number of layers, and CoMP states; if the value of the 8-value indicator is equal to 0, 2, 4 or 6, the UE interpreting that 2 layers, ports 7-8 and $n_{SCID}=0$ are configured; if the value of the 8-value indicator is equal to 1, 3, 5 or 7, the UE interpreting that 2 layers, ports 7-8 and $n_{SCID}=1$ are configured; if the value of the 8-value indicator is equal to 0 or 1, the UE selecting a first CoMP state from four CoMP states; if the value of the 8-value indicator is equal to 2 or 3, the UE selecting a second CoMP state from the four CoMP states; if the value of the 8-value indicator is equal to 4 or 5, the UE selecting a third CoMP state from the four CoMP states; and if the value of the 8-value indicator is equal to 6 or 7, the UE selecting a fourth CoMP state from the four CoMP states.

According to yet another embodiment of the present disclosure, there is provided a wireless communication method of signaling coordinated multipoint (CoMP) states with one transport block (TB) enabled and one TB disabled, comprising: transmitting a downlink control information (DCI) from a transmission point (TP) to a user equipment (UE), wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB; if the value of the 8-value indicator is equal to 0, 2, 4 or 6, the UE interpreting that 2 layers, ports 7-8 and $n_{SCID}=0$ are configured; if the value of the 8-value indicator is equal to 1, 3, 5 or 7, the UE interpreting that 2 layers, ports 7-8 and $n_{SCID}=1$ are configured; if the NDI of the disabled TB is in a predetermined state, then if the value of the 8-value indicator is equal to 0 or 1, the UE selecting a first CoMP state from four CoMP states, if the value of the 8-value indicator is equal to 2 or 3, the UE selecting a second CoMP state from the four CoMP states, if the value of the 8-value indicator is equal to 4 or 5, the UE selecting a third CoMP state from the four CoMP states, and if the value of the 8-value indicator is equal to 6 or 7, the UE selecting a fourth CoMP state from the four CoMP states; and if the NDI of the disabled TB is not in the predetermined state, then if the value of the 8-value indicator is equal to 0 or 1, the UE selecting a fifth CoMP state from another four CoMP states, if the value of the 8-value indicator is equal to 2 or 3, the UE selecting a sixth CoMP state from said anther four CoMP states, if the value of the 8-value indicator is equal to 4 or 5, the UE selecting a seventh CoMP state from said anthor four CoMP states, and if the value of the 8-value indicator is equal to 6 or 7, the UE selecting a eighth CoMP state from said anthor four CoMP states.

According to yet another embodiment of the present disclosure, there is provided a wireless communication method of configuring coordinated multipoint (CoMP) states, comprising: configuring more CoMP states for transmission with fewer layers than for transmission with more layers.

According to yet another embodiment of the present disclosure, there is provided a transmission point (TP) for signaling coordinated multipoint (CoMP) states with one transport block (TB) enabled and one TB disabled, comprising: a transmission unit configured to transmit downlink control information (DCI) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB; and a configuration unit configured to set a CoMP state selected from a first CoMP state and a second CoMP state by the NDI of the disabled TB if the NDI of the enabled TB is untoggled or the value of the 8-value indicator for the enabled TB is equal to 0, 1, 2, or 3, and to configure a single layer and a third CoMP state for the enabled TB and set whether the enabled TB is initial transmission or retransmission by the NDI of the disabled TB if the NDI of the enabled TB is toggled and the value of the 8-value indicator is 4, 5, 6, or 7.

According to yet another embodiment of the present disclosure, there is provided a user equipment (UE) for determining coordinated multipoint (CoMP) states with one transport block (TB) enabled and one TB disabled, comprising: a receiving unit configured to receive a downlink control information (DCI) from a transmission point (TP) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB; a determination unit configured to use the NDI of the disabled TB to select a CoMP state from a first CoMP state and a second CoMP state if the NDI of the enabled TB is untoggled or the value of the 8-value indicator for the enabled TB is equal to 0, 1, 2, or 3, and to interpret that a single layer and a third CoMP state are configured for the enabled TB and obtain the information of whether the enabled TB is initial transmission or retransmission based on the NDI of the disabled TB if the NDI of the enabled TB is toggled and the value of the 8-value indicator is 4, 5, 6, or 7.

According to yet another embodiment of the present disclosure, there is provided a transmission point (TP) for signaling coordinated multipoint (CoMP) states with one transport block (TB) enabled and one TB disabled, comprising: a transmission unit configured to transmit a downlink control information (DCI) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB; and a configuration unit configured to set a CoMP state selected from a first CoMP state and a second CoMP state by the NDI of the disabled TB if the value of the 8-value indicator for the enabled TB is equal to 0, 1, 2, or 3, and configure a single layer and a third CoMP state for the enabled TB if the value of the 8-value indicator is 4, 5, 6, or 7 and the NDI of the disabled TB is in a predetermined state.

According to yet another embodiment of the present disclosure, there is provided a user equipment (UE) for determining coordinated multipoint (CoMP) states with one transport block (TB) enabled and one TB disabled, comprising: a receiving unit configured to receive a downlink control information (DCI) from a transmission point (TP) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB; a determination unit configured to use the NDI of the disabled TB to select a CoMP state from a first CoMP state and a second CoMP state if the value of the 8-value indicator for the enabled TB is equal to 0, 1, 2, or 3, and to interpret that a single layer and a third CoMP state are configured for the enabled TB if the value of the 8-value indicator is 4, 5, 6, or 7 and the NDI of the disabled TB is in a predetermined state.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered as limiting of its scope, the disclosure will be described with additional specificity and detail through use of the accompanying drawings, in which:

FIG. 1 illustrates a wireless communication method according to a first embodiment of the present disclosure;

FIG. 2 schematically illustrates a wireless communication system in Dynamic Point Selection (DPS) operation;

FIG. 3 schematically illustrates a wireless communication system in Joint Transmission (JT) operation;

FIG. 8 schematically illustrates operation states for TB1 enabled and TB2 disabled according to a third embodiment of the present disclosure;

FIG. 9 illustrates a wireless communication method according to a third embodiment of the present disclosure;

DETAILED DESCRIPTION

Figure 4:
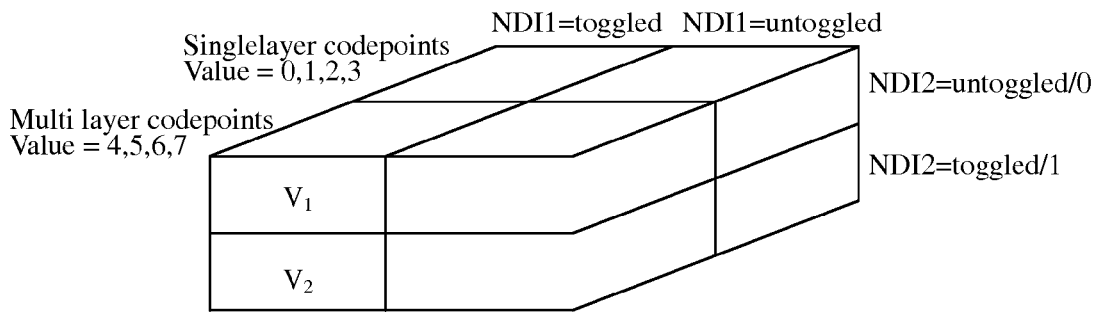
FIG. 4 schematically illustrates operation states for TB1 enabled and TB2 disabled according to a second embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

First Embodiment

We note that it is sensible to have different number of states for different transmission rank in CoMP operation, and less number of states may be needed for more layer (larger rank) transmission. For example, at least three states may be necessary for single layer transmission, and for two layer transmission, the necessary number of states may be less (e.g. two states) because two layer transmission is more likely in cell center. For even more layer transmission e.g. 3-8 layer transmission, the necessary number of states can be even smaller, for example, only a single state may be enough for 3-8 layer transmission since 3-8 layer transmission happens more likely in single cell operation or in a state that the UE is very close to a TP and not possible to move to another TP very quickly, and thus it may be enough to signal or configure a single state through higher layer (e.g. RRC or MAC layer) for 3-8 layer transmission. Therefore, it is sensible to configure more CoMP states for transmission with fewer layers than for transmission with more layers.

In view of above, a first embodiment of the present disclosure provides a wireless communication method of configuring CoMP states, as shown in FIG. 1, comprising configuring more CoMP states for transmission with fewer layers than for transmission with more layers (step 101). In particular, 3 CoMP states may be configured for 1 layer transmission, 2 CoMP states may be configured for 2 layer transmission, and 1 CoMP state may be configured for 3-8 layer transmission. These CoMP states can be signaled through higher layer from a TP to a UE for the UE to select based on an indicator in DCI. It is noted that here "CoMP state" may be a single cell state but a "CoMP state" in some cases, but it is generally referred to as "CoMP state" in this disclosure. In the following, two examples for explaining the states in CoMP operation are described.

FIG. 2 schematically illustrates a wireless communication system in DPS operation. In this condition, a UE is related to a macro TP and a pico TP, and there could be three CoMP states, as listed in Table 2.

TABLE 2

States for DPS operation

| state | CRS rate matching | DMRS quasi-colocation |
|---|---|---|
| A | macro | macro |
| B | pico | pico |
| C | macro | pico |

In Table 2, state A is a single point operation and indicates macro PDSCH transmission, state B is a single point operation and indicates pico PDSCH transmission, and state C is a dynamic blanking operation and indicates pico PDSCH transmission. In state C, because the UE in CRE region experiences CRS interference from macro which is larger than CRS power from pico, it is preferred to rate match CRS from macro, though DMRS is quasi-colocated with pico CSI-RS.

For a single layer transmission, UE may be in all the three states mentioned above, i.e. UE may use DCI to select from state A, B or C. For 2 layer transmission, UE may only be in state A or B, i.e. UE may use DCI to select only from state A or B, since 2 layer transmission is less likely to happen in severe CRE region. As for even more layer transmission, e.g. 3-8 layer transmission, a single state may be enough since in this case UE must be very close to macro TP or pico TP and is not likely to move to the other TP very quickly, and the single state (e.g. A or B) may be singled through higher layer.

FIG. 3 schematically illustrates a wireless communication system in Joint Transmission (JT) operation. In this condition, a UE is related to two macro TPs (Macro I and Macro II), there could be three CoMP states, as listed in Table 3.

TABLE 3

States for JT operation

| state | CRS rate matching | DMRS quasi-colocation |
|---|---|---|
| A | Macro I | Macro I |
| B | Macro II | Macro II |
| C | MBSFN | Macro I & II |

In Table 3, state A is a single cell operation with macro I, state B is a single cell operation with macro II, and state C is in JT mode. For a single layer transmission, UE may be in all the three states mentioned above, i.e. UE may use DCI to select from state A, B or C. However, for 2 layer transmission, UE does not need to dynamically switch between all the three states because UE will not move from macro I center to macro II center dynamically. UE may use DCI to select from state A and C, or to select from B and C, and the set of state A and C or the set of state B and C is configured through higher layer. As for even more layer transmission, e.g. 3-8 layer transmission, a single state may be enough since in this case UE must be very close to one TP and not possible to move to the other TP very quickly, and the single state (e.g. state A or B) may be singled through higher layer.

It is noted that the above states A, B or C are only examples, the states mentioned in the present disclosure is not limited to the above mentioned states, and the present disclosure can be applied to any CoMP states. In addition, states A, B and C in other embodiments are not necessarily corresponding to the states A, B and C in the above examples, for example, state A described in the second embodiment is not necessary to be state A in the above examples, but can be state B or C mentioned above or any other CoMP state.

Second Embodiment

For single layer transmission, only 1 CW is enabled, i.e. only 1 TB is enabled. The disabled CW has $I_{MCS}=0$ and rvidx=1, and the NDI (new data indicator) of the disabled CW is not used. Therefore, for single layer transmission, which corresponds to value 0, 1, 2, 3 of left column in Table 1, we can use the NDI of disabled CW to indicate CoMP states (e.g. state A or B), However, two states may not be sufficient for single layer CoMP operation. We notice that value=4, 5, 6, 7 (refer to Table 1) is not used if the enabled TB is new data (NDI of enabled TB=toggled), because multi layer 1 CW transmission is used only for retransmission as discussed in the background. Therefore, it is possible to reuse those codepoints (V1 and V2 in FIG. 4) to indicate a third CoMP state (e.g. state C) for single layer transmission, as shown in FIG. 4. In FIG. 4 and the following discussions, it is assumed that TB1 is enabled, while TB2 is disabled, however, the case that TB2 is enabled and TB1 is disabled can be discussed exactly the same. FIG. 4 shows possible states that the 8-value indicator of the enabled TB can indicate in conjunction with the NDI of the enabled TB (NDI1) and the NDI of the disabled TB (NDI2). As explained above, when the NDI of enabled TB is toggled, the multilayer codepoints (i.e. the value of the 8-value indicator is 4, 5, 6, or 7) are not used for 1 CW transmission according to the specification of LTE Rel-10. The vacant (not used) codepoints are shown in blocks V1 and V2 in FIG. 4. In the embodiment of the present disclosure, these vacant code points will be used to indicate a third state (e.g. state C) for a single layer transmission, and NDI2 is used to indicate whether the single layer transmission in the third state is initial transmission (new data) or retransmission (corresponding to block V1 and V2 respectively). For example, block V1 (value=4, 5, 6, or 7 and NDI2=0 or untoggled) in FIG. 4 can indicate a single layer retransmission in a third state, and block V2 (value=4, 5, 6, or 7 and NDI2=1 or toggled) can indicate an initial single layer transmission in the third state. Obviously, the meaning of V1 and V2 can be exchanged. It is noted that the NDI2 can be represented in the form of 0 or 1, for example "0" represents retransmission, "1" represents initial transmission; alternatively, NDI2 can be in the form of being toggled or untoggled with respect to the NDI1 in a previous transmission, for example, if NDI2 is changed (toggled) with respect to NDI1 in a previous transmission, it indicates the current transmission is initial transmission (new data), and if NDI2 is not changed (untoggled) with respect to NDI1 in a previous transmission, it indicates that the current transmission is retransmission.

Figure 5:
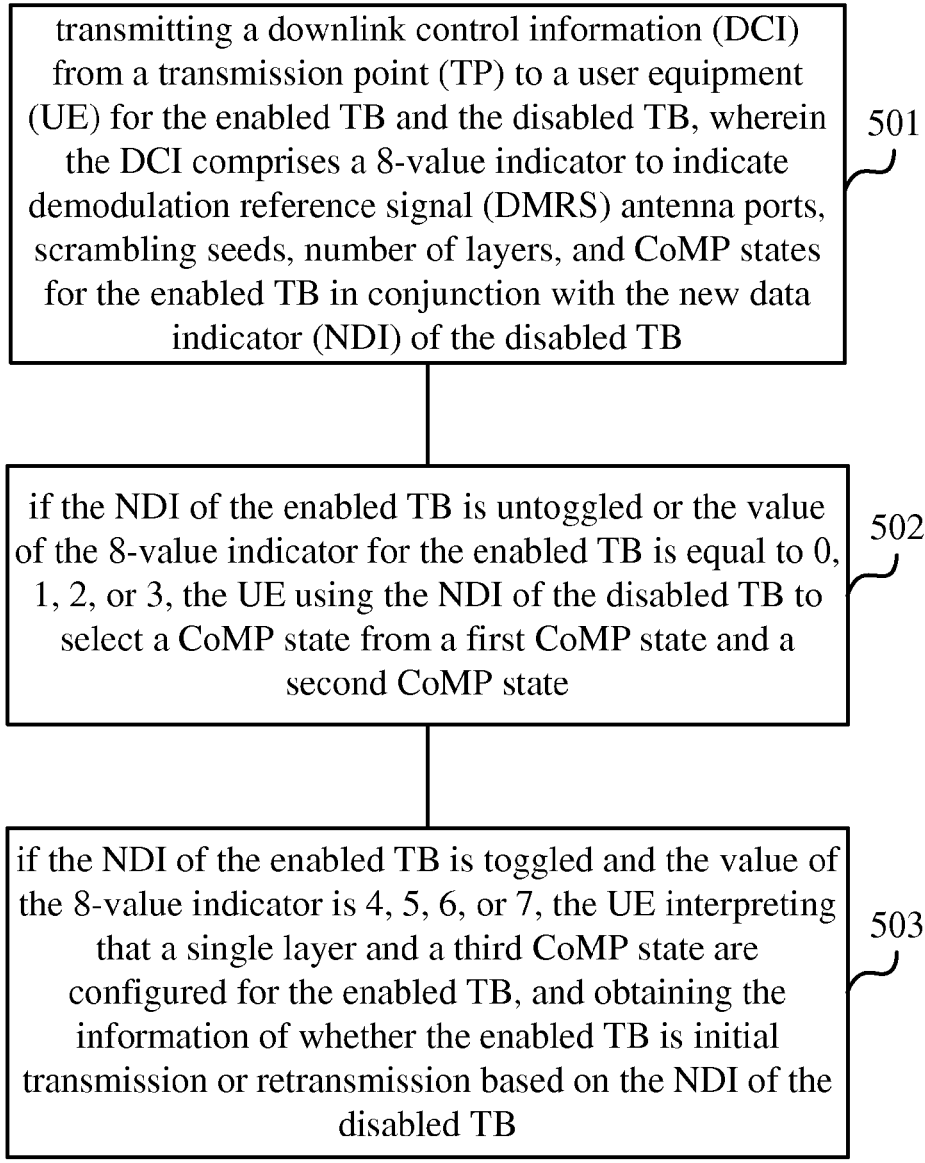
FIG. 5 illustrates a wireless communication method according to the second embodiment.

In view of the above analysis, an embodiment of the present disclosure provides a wireless communication method of signaling coordinated multipoint (CoMP) states with one transport block (TB) enabled and one TB disabled, as shown in FIG. 5, comprising: transmitting a downlink control information (DCI) from a transmission point (TP) to a user equipment (UE) for the enabled TB (TB1 in the above example) and the disabled TB (TB2 in the above example), wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB (step 501); if the NDI of the enabled TB is untoggled or the value of the 8-value indicator for the enabled TB is equal to 0, 1, 2, or 3, the UE using the NDI of the disabled TB to select a CoMP state from a first CoMP state and a second CoMP state (step 502); and if the NDI of the enabled TB is toggled and the value of the 8-value indicator is 4, 5, 6, or 7, the UE interpreting that a single layer and a third CoMP state are configured for the enabled TB, and obtaining the information of whether the enabled TB is initial transmission or retransmission based on the NDI of the disabled TB (step 503). It is noted that the conditional steps (step 503 and step 504) are not necessarily performed in the described order; they can be performed for example in a reverse order or at the same time. This comment holds true for any method in this disclosure.

In the above wireless communication method, the 8-value indicator corresponds to Table 1 to indicate DMRS antenna ports (e.g. port 7, ports 7-8, etc.), scrambling identity ($n_{SCID}$), number of layers (e.g. 1 layer, 2 layers, etc.). The first CoMP state, the second CoMP state, and the third CoMP state can be configured through higher layer (e.g. RRC or MAC), and these states can be the states A, B or C discussed in the first embodiment or any other CoMP states. The NDI of the disabled TB (NDI2) can be represented in the form of 0 or 1, for example "0" represents retransmission, "1" represents initial transmission; alternatively, NDI2 can be in the form of being toggled or untoggled with respect to the NDI of the enabled TB (NDI1) in a previous transmission, for example, if NDI2 is changed (toggled) with respect to NDI1 in a previous transmission, it indicates the current transmission is initial transmission (new data), and if NDI2 is not changed (untoggled) with respect to NDI1 in a previous transmission, it indicates that the current transmission is retransmission.

In addition, if the NDI of the enabled TB is untoggled or the value of the 8-value indicator for the enabled TB is equal to 0, 1, 2, or 3, UE can follow the Rel-10 signaling for DMRS antenna ports, scrambling identity, and number of layers. In other words, the above wireless communication method can further comprise: if the value of the 8-value indicator is equal to 0, the UE interpreting that 1 layer, port 7 and $n_{SCID}=0$ are configured for the enabled TB; if the value of the 8-value indicator is equal to 1, the UE interpreting that 1 layer, port 7 and $n_{SCID}=1$ are configured for the enabled TB; if the value of the 8-value indicator is equal to 2, the UE interpreting that 1 layer, port 8 and $n_{SCID}=0$ are configured for the enabled TB; if the value of the 8-value indicator is equal to 3, the UE interpreting that 1 layer, port 8 and $n_{SCID}=1$ are configured for the enabled TB; if the NDI of the enabled TB is untoggled, then if the value of the 8-value indicator is equal to 4, the UE interpreting that 2 layers and ports 7-8 are configured for the enabled TB, if the value of the 8-value indicator is equal to 5, the UE interpreting that 3 layers and ports 7-9 are configured for the enabled TB, if the value of the 8-value indicator is equal to 6, the UE interpreting that 4 layers and ports 7-10 are configured for the enabled TB, and if the value of the 8-value indicator is equal to 7, the UE interpreting that the value of 7 is reserved; and if the NDI of the enabled TB is toggled, then if the value of the 8-value indicator is equal to 4, the UE interpreting that 1 layer, port 7 and $n_{SCID}=0$ are configured for the enabled TB, if the value of the 8-value indicator is equal to 5, the UE interpreting that 1 layer, port 7 and $n_{SCID}=1$ are configured for the enabled TB, if the value of the 8-value indicator is equal to 6, the UE interpreting that 1 layer, port 8 and $n_{SCID}=0$ are configured for the enabled TB, and if the value of the 8-value indicator is equal to 7, the UE interpreting that 1 layer, port 8 and $n_{SCID}=1$ are configured for the enabled TB.

Table 4 shows an example operation of the second embodiment.

TABLE 4

Operation of the second embodiment

| state | Single layer initial Tx | Single layer ReTx | Multi-layer ReTx |
|---|---|---|---|
| A | NDI1 = toggled, value = 0, 1, 2, 3 NDI2 = 0 or untoggled | NDI1 = untoggled, value = 0, 1, 2, 3 NDI2 = 0 or untoggled | NDI1 = untoggled, value = 4, 5, 6, 7 NDI2 = 0 or untoggled |
| B | NDI1 = toggled, value = 0, 1, 2, 3 NDI2 = 1 or toggled | NDI1 = untoggled, value = 0, 1, 2, 3 NDI2 = 1 or toggled | NDI1 = untoggled, value = 4, 5, 6, 7 NDI2 = 1 or toggled |
| C | NDI1 = toggled, value = 4, 5, 6, 7 (re-interpret as single layer Tx) NDI2 = 1 or toggled (compared to last NDI for TB1) | NDI1 = toggled, value = 4, 5, 6, 7 (re-interpret as single layer Tx) NDI2 = 0 or untoggled (compared to last NDI for TB1) | N/A (not supported) *acceptable due to less likely to be CoMP, because the relevant initial transmission is layer 3~8 (very cell center) |

From the above table, it can be seen that without our proposal only 2 states can be indicated for both single layer transmission and multiple layer transmission (see the lines for state A and B), but with the second embodiment, 3 states can be indicated for single layer transmission (see the line for state C). Therefore, according to the second embodiment of the present disclosure, additional CoMP state is indicated in DCI while not increasing DCI size.

In addition, a variation to the second embodiment can further increase CoMP states. By second embodiments, we allow three states for single layer. We can further combine the second embodiment with the information of which TB is disabled, e.g. If TB2 (the second mapped TB) is disabled and TB1 (the first mapped TB) is enabled, state A/B/C can be indicated for Single layer transmission and state A/B can be indicated for Multilayer transmission; If TB1 is disabled and TB1 is enabled, state D/E/F can be indicated for Single layer transmission and state D/E can be indicated for Multilayer transmission. In other words, different sets of the first CoMP state, the second CoMP state, and the third CoMP state can be configured for the case that the enabled TB is the first mapped TB and for the case that the enabled TB is the second mapped TB, respectively.

It is noted that the concept of configuring different set of states for the case that the enabled TB is the first mapped TB and for the case that the enabled TB is the second mapped TB can also be applied to other 1 CW embodiments to further increase CoMP states.

This variation is quite useful for initial transmission because TP can freely choose which TB is enabled. On the other hand, it has some limitation in case of retransmission, because the retransmission has to be in the same TB of the initial transmission; therefore the TP does not have freedom to choose which TB is enabled for retransmission. It might be acceptable to limit CoMP states of retransmission to be in the same set of CoMP states of initial transmission. For example, if we use state A/B/C to support JT CoMP, and state D/E/F to support dynamic blanking CoMP, it might be reasonable to assume the CoMP operation is not changed between initial and re-transmission since there are only several subframes inbetween.

Figure 6:
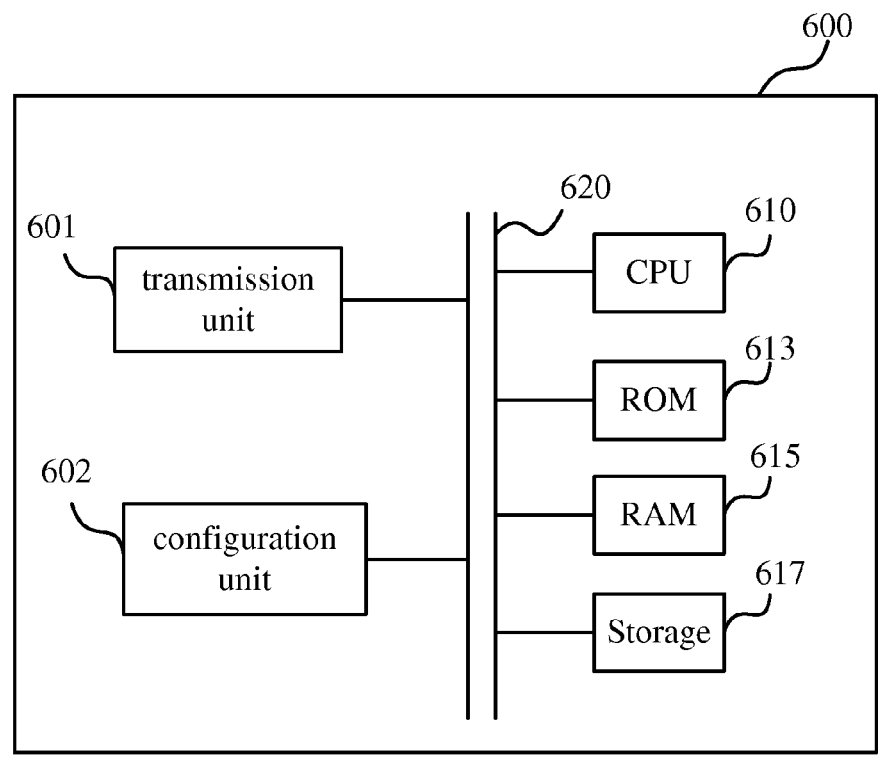
FIG. 6 is a block diagram schematically illustrating a transmission point (TP) according to the second embodiment.

FIG. 6 is a block diagram showing a TP 600 according to the first embodiment of the present disclosure. The TP 600 includes a transmission unit 601 configured to transmit downlink control information (DCI) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB. The TP 600 also includes a configuration unit 602 configured to set a CoMP state selected from a first CoMP state and a second CoMP state by the NDI of the disabled TB if the NDI of the enabled TB is untoggled or the value of the 8-value indicator for the enabled TB is equal to 0, 1, 2, or 3, and to configure a single layer and a third CoMP state for the enabled TB and set whether the enabled TB is initial transmission or retransmission by the NDI of the disabled TB if the NDI of the enabled TB is toggled and the value of the 8-value indicator is 4, 5, 6, or 7.

The TP 600 according to the present disclosure may further include a CPU (Central Processing Unit) 610 for executing related programs to process various data and control operations of respective units in the TP 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a storage unit 617 for storing various programs, data and so on. The above transmission unit 601, configuration unit 602, CPU 610, ROM 613, RAM 615 and/or storage unit 617, etc. may be interconnected via data and/or command bus 620 and transfer signals between one another.

Respective units as described above do not limit the scope of the present disclosure. According to one embodiment of the disclosure, the functions of the above transmission unit 601, and configuration unit 602 may also be implemented by only one unit such as a transmission unit, and the functions of any or combination of above transmission unit 601 and configuration unit 602 may also be implemented by functional software in combination with the above CPU 610, ROM 613, RAM 615 and/or storage unit 617 etc.

Figure 7:
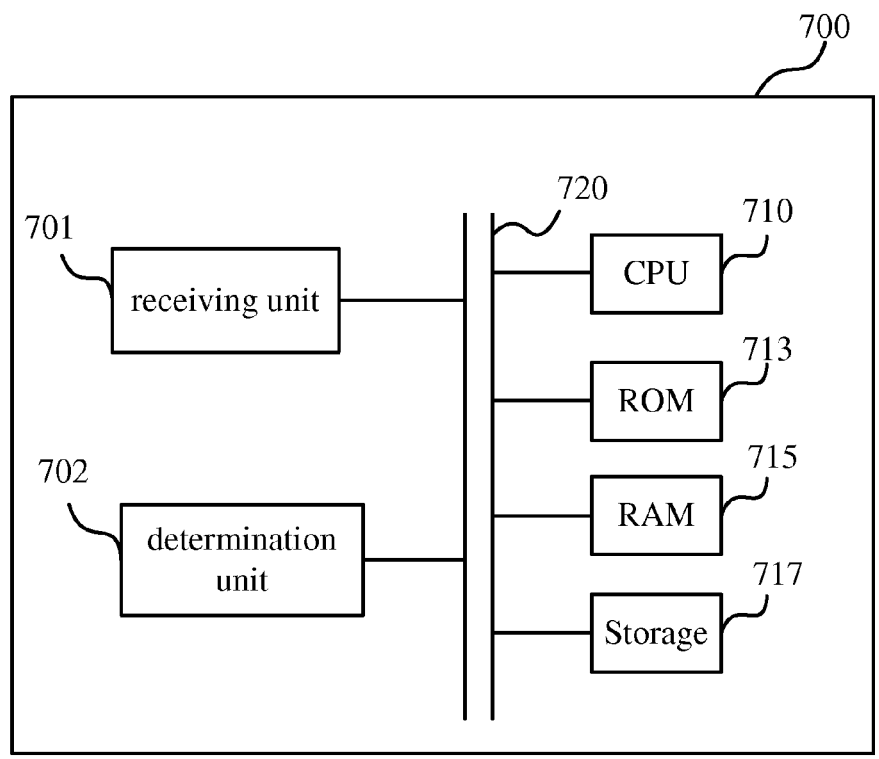
FIG. 7 is a block diagram schematically illustrating a user equipment (UE) according to the second embodiment.

FIG. 7 is a block diagram showing a UE 700 according to the first embodiment of the present disclosure. The UE 700 includes a receiving unit 701 configured to receive a downlink control information (DCI) from a transmission point (TP) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB. The UE 700 also includes a determination unit 702 configured to use the NDI of the disabled TB to select a CoMP state from a first CoMP state and a second CoMP state if the NDI of the enabled TB is untoggled or the value of the 8-value indicator for the enabled TB is equal to 0, 1, 2, or 3, and to interpret that a single layer and a third CoMP state are configured for the enabled TB and obtain the information of whether the enabled TB is initial transmission or retransmission based on the NDI of the disabled TB if the NDI of the enabled TB is toggled and the value of the 8-value indicator is 4, 5, 6, or 7.

The UE 700 according to the present disclosure may further include a CPU (Central Processing Unit) 710 for executing related programs to process various data and control operations of respective units in the UE 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a storage unit 717 for storing various programs, data and so on. The above receiving unit 701, determination unit 702, CPU 710, ROM 713, RAM 715 and/or storage unit 717, etc. may be interconnected via data and/or command bus 720 and transfer signals between one another.

Respective units as described above do not limit the scope of the present disclosure. According to one embodiment of the disclosure, the functions of the above receiving unit 701 and determination unit 702 may also be implemented by only one unit such as a receiving unit, and the functions of any or combination of the above receiving unit 701 and determination unit 702 may also be implemented by functional software in combination with the above CPU 710, ROM 713, RAM 715 and/or storage unit 717, etc.

Third Embodiment

The third embodiment exploits the fact that it is not necessary to indicate multiple states for multi layer 1 CW transmission which is quite unlikely to be a CoMP transmission because its relevant initial transmission is rank 3-8 and very unlikely to be a CoMP transmission. Rank 3-8 is very cell center, and there are only several subframes between initial transmission and retransmission; therefore, it is unlikely to change to CoMP mode within such a short time. In this connection, it is not necessary to use NDI2 (NDI of the disabled TB) to indicate different states for multi layer transmission since only one state is needed to be configured for multi layer transmission and the one state can be configured through higher layer. Therefore, when the value=4, 5, 6 or 7, NDI2 is not useful according to the current specification. According to the third embodiment, when the value=4, 5, 6 or 7, NDI2 is used to indicate a third state for single layer transmission, i.e. when NDI2 is in a predetermined state, it indicates a third state for a single layer transmission. For example, as shown in FIG. 8, when value=4, 5, 6 or 7, if NDI2 is 1/toggled (predetermined state), it indicates a single layer transmission in a third state (represented by C), and if NDI2 is 0/untoggled, it still indicates a multilayer transmission. The state of the multi-layer transmission is represented by state A in FIG. 8; however, it is not limited to this, it can be any appropriate state and can be configured and singled through higher layer. For value=0, 1, 2 or 3, the DCI signaling can be the same with Rel-10, and NDI2 is used to indicate a state among a first state (e.g. state A) and a second state (e.g. state B). In FIG. 8, state A is chosen for NDI2=0/untoggled, and state B is chosen for NDI2=1/toggled; however, it is not limited to this, for example, state A can be chosen for NDI2=1/toggled, and state B can be chosen for NDI2=0/untoggled.

In view of above, the third embodiment of the present disclosure provides a wireless communication method of signaling coordinated multipoint (CoMP) states with one transport block (TB) enabled and one TB disabled, as shown in FIG. 9, comprising: transmitting a downlink control information (DCI) from a transmission point (TP) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB (step 901); if the value of the 8-value indicator for the enabled TB is equal to 0, 1, 2, or 3, the UE using the NDI of the disabled TB to select a CoMP state from a first CoMP state and a second CoMP state (step 902); and if the value of the 8-value indicator is 4, 5, 6, or 7 and the NDI of the disabled TB is in a predetermined state, the UE interpreting that a single layer and a third CoMP state are configured for the enabled TB (step 903).

In the above wireless communication method, the first CoMP state, the second CoMP state, and the third CoMP state can be configured through higher layer (e.g. RRC or MAC), and these states can be the states A, B or C discussed in the first embodiment or any other CoMP states. The NDI of the disabled TB (NDI2) can be represented in the form of 0 or 1, or in the form of being toggled or untoggled with respect to the NDI of the enabled TB (NDI1) in a previous transmission, and accordingly the predetermined state of NDI2 could be 0 or 1, or be toggled or untoggled.

In addition, for other parameters signaled by DCI which are not specifically defined in the above wireless communication method, UE can follow the specification of Rel-10, for example, NDI1 is still used to indicate whether the enabled TB is initial transmission or retransmission. In particular, the above method according to the third embodiment can further comprise: if the value of the 8-value indicator is equal to 0, the UE interpreting that 1 layer, port 7 and $n_{SCID}=0$ are configured for the enabled TB; if the value of the 8-value indicator is equal to 1, the UE interpreting that 1 layer, port 7 and $n_{SCID}=1$ are configured for the enabled TB; if the value of the 8-value indicator is equal to 2, the UE interpreting that 1 layer, port 8 and $n_{SCID}=0$ are configured for the enabled TB; if the value of the 8-value indicator is equal to 3, the UE interpreting that 1 layer, port 8 and $n_{SCID}=1$ are configured for the enabled TB; if the NDI of the disabled TB is not in the predetermined states, then if the value of the 8-value indicator is equal to 4, the UE interpreting that 2 layers and ports 7-8 are configured for the enabled TB, if the value of the 8-value indicator is equal to 5, the UE interpreting that 3 layers and ports 7-9 are configured for the enabled TB, if the value of the 8-value indicator is equal to 6, the UE interpreting that 4 layers and ports 7-10 are configured for the enabled TB, and if the value of the 8-value indicator is equal to 7, the UE interpreting that the value of 7 is reserved; and if the NDI of the disabled TB is in the disabled state, then if the value of the 8-value indicator is equal to 4, the UE interpreting that 1 layer, port 7 and $n_{SCID}=0$ are configured for the enabled TB, if the value of the 8-value indicator is equal to 5, the UE interpreting that 1 layer, port 7 and $n_{SCID}=1$ are configured for the enabled TB, if the value of the 8-value indicator is equal to 6, the UE interpreting that 1 layer, port 8 and $n_{SCID}=0$ are configured for the enabled TB, and if the value of the 8-value indicator is equal to 7, the UE interpreting that 1 layer, port 8 and $n_{SCID}=1$ are configured for the enabled TB.

Tables 5 and 6 illustrate two example designs for 1 CW design. In Table 5, when NDI2 (Disabled NDI)=0 (not in a predetermined state), the multi layer transmission (value=4, 5 or 6) is only allowed a single state which can be configured and signaled through higher layer, i.e. if the NDI of the disabled TB is not in the predetermined state, the CoMP state for the value of 4, 5, 6, or 7 is signaled through higher layer. Here, the state is represented by state A, but it not limited to this, and it can be any appropriate state.

TABLE 5

1 CW design (allow single state for multi layer 1 CW)
One Codeword: Codeword 0 enabled, Codeword 1 disabled

| | Disabled NDI = 0 | | Disabled NDI = 1 |
|---|---|---|---|
| Value | Message | Value | Message |
| 0 | 1 layer, port 7, $n_{SCID}=0$, state A | 0 | 1 layer, port 7, $n_{SCID}=0$, state B |
| 1 | 1 layer, port 7, $n_{SCID}=1$, state A | 1 | 1 layer, port 7, $n_{SCID}=1$, state B |
| 2 | 1 layer, port 8, $n_{SCID}=0$, state A | 2 | 1 layer, port 8, $n_{SCID}=0$, state B |
| 3 | 1 layer, port 8, $n_{SCID}=1$, state A | 3 | 1 layer, port 8, $n_{SCID}=1$, state B |
| 4 | 2 layers, ports 7-8, state A | 4 | 1 layer, port 7, $n_{SCID}=0$, state C |
| 5 | 3 layers, ports 7-9, state A | 5 | 1 layer, port 7, $n_{SCID}=1$, state C |
| 6 | 4 layers, ports 7-10, state A | 6 | 1 layer, port 8, $n_{SCID}=0$, state C |
| 7 | Reserved | 7 | 1 layer, port 8, $n_{SCID}=1$, state C |

Table 6 is similar to Table 5 except that the multi layer 1 CW transmission is assumed to be single cell operation because the initial transmission is rank 3-8. Therefore, it is possible to fix the state for value 4, 5, 6, 7 when disabled NDI=0 to be "serving cell", i.e. if the NDI of the disabled TB is not in the predetermined state, the CoMP state for the value of 4, 5, 6, or 7 is fixed to be a state of serving cell. The meaning of "serving cell" is that the MBSFN subframe and CRS pattern follows serving cell configuration, so UE rate match only serving cell CRS.

TABLE 6

1 CW design (allow single state "serving cell" for multi layer 1 CW)
One Codeword: Codeword 0 enabled, Codeword 1 disabled

| | Disabled NDI = 0 | | Disabled NDI = 1 |
|---|---|---|---|
| Value | Message | Value | Message |
| 0 | 1 layer, port 7, $n_{SCID}=0$, state A | 0 | 1 layer, port 7, $n_{SCID}=0$, state B |
| 1 | 1 layer, port 7, $n_{SCID}=1$, state A | 1 | 1 layer, port 7, $n_{SCID}=1$, state B |
| 2 | 1 layer, port 8, $n_{SCID}=0$, state A | 2 | 1 layer, port 8, $n_{SCID}=0$, state B |
| 3 | 1 layer, port 8, $n_{SCID}=1$, state A | 3 | 1 layer, port 8, $n_{SCID}=1$, state B |
| 4 | 2 layers, ports 7-8, serving cell | 4 | 1 layer, port 7, $n_{SCID}=0$, state C |
| 5 | 3 layers, ports 7-9, serving cell | 5 | 1 layer, port 7, $n_{SCID}=1$, state C |
| 6 | 4 layers, ports 7-10, serving cell | 6 | 1 layer, port 8, $n_{SCID}=0$, state C |
| 7 | Reserved | 7 | 1 layer, port 8, $n_{SCID}=1$, state C |

Similarly, we can also configure value 0-3 when disabled NDI=0 or 1 as serving cell, i.e., define state A or B=serving cell. In other words, the first CoMP state or the second CoMP state is defined to be a state of serving cell. This way will reduce CoMP states to only B/C or A/C, i.e., less friendly to CoMP operation, but more friendly to single cell operation.

Based on the above analysis, it is concluded that, according to the third embodiment, three states are signaled for single layer transmission and only a single state is configured for multi layer 1CW transmission while not increasing the size of DCI. In addition, in order to further increase CoMP states, as explained in the second embodiment, different sets of the first CoMP state, the second CoMP state, and the third CoMP state can be configured for the case that the enabled TB is the first mapped TB and for the case that the enabled TB is the second mapped TB, respectively.

Figure 10:
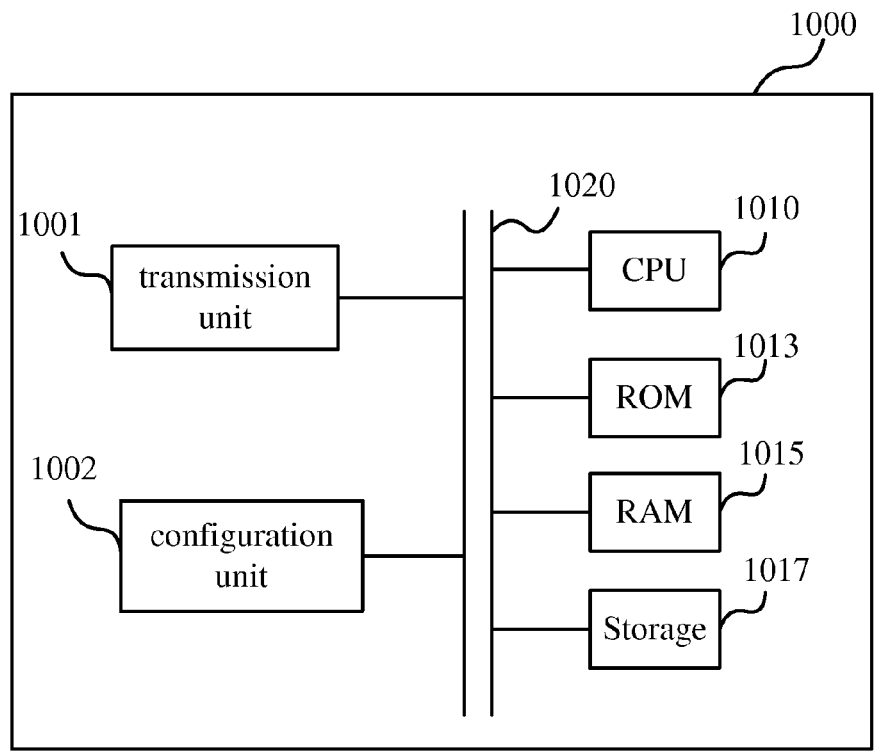
FIG. 10 is a block diagram schematically illustrating a transmission point (TP) according to the third embodiment.

FIG. 10 is a block diagram showing a TP 1000 according to the first embodiment of the present disclosure. The TP 1000 includes a transmission unit 1001 configured to transmit a downlink control information (DCI) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB. The TP 1000 also includes a configuration unit 1002 configured to set a CoMP state selected from a first CoMP state and a second CoMP state by the NDI of the disabled TB if the value of the 8-value indicator for the enabled TB is equal to 0, 1, 2, or 3, and configure a single layer and a third CoMP state for the enabled TB if the value of the 8-value indicator is 4, 5, 6, or 7 and the NDI of the disabled TB is in a predetermined state.

The TP 1000 according to the present disclosure may further include a CPU (Central Processing Unit) 1010 for executing related programs to process various data and control operations of respective units in the TP 1000, a ROM (Read Only Memory) 1013 for storing various programs required for performing various process and control by the CPU 1010, a RAM (Random Access Memory) 1015 for storing intermediate data temporarily produced in the procedure of process and control by the CPU 1010, and/or a storage unit 1017 for storing various programs, data and so on. The above transmission unit 1001, configuration unit 1002, CPU 1010, ROM 1013, RAM 1015 and/or storage unit 1017, etc. may be interconnected via data and/or command bus 1020 and transfer signals between one another.

Respective units as described above do not limit the scope of the present disclosure. According to one embodiment of the disclosure, the functions of the above transmission unit 1001, and configuration unit 1002 may also be implemented by only one unit such as a transmission unit, and the functions of any or combination of above transmission unit 1001 and configuration unit 1002 may also be implemented by functional software in combination with the above CPU 1010, ROM 1013, RAM 1015 and/or storage unit 1017 etc.

Figure 11:
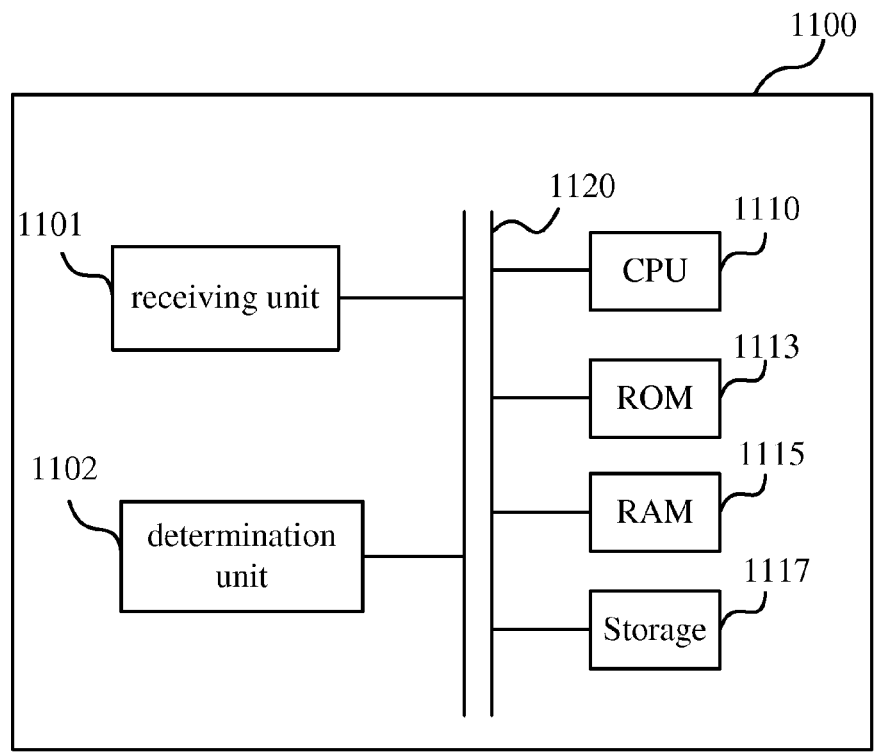
FIG. 11 is a block diagram schematically illustrating a user equipment (UE) according to the third embodiment.

FIG. 11 is a block diagram showing a UE 1100 according to the first embodiment of the present disclosure. The UE 1100 includes a receiving unit 1101 configured to receive a downlink control information (DCI) from a transmission point (TP) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB. The UE 1100 also includes a determination unit 1102 configured to select a CoMP state from a first CoMP state and a second CoMP state if the value of the 8-value indicator for the enabled TB is equal to 0, 1, 2, or 3, and to interpret that a single layer and a third CoMP state are configured for the enabled TB if the value of the 8-value indicator is 4, 5, 6, or 7 and the NDI of the disabled TB is in a predetermined state.

The UE 1100 according to the present disclosure may further include a CPU (Central Processing Unit) 1110 for executing related programs to process various data and control operations of respective units in the UE 1100, a ROM (Read Only Memory) 1113 for storing various programs required for performing various process and control by the CPU 1110, a RAM (Random Access Memory) 1115 for storing intermediate data temporarily produced in the procedure of process and control by the CPU 1110, and/or a storage unit 1117 for storing various programs, data and so on. The above receiving unit 1101, determination unit 1102, CPU 1110, ROM 1113, RAM 1115 and/or storage unit 1117, etc. may be interconnected via data and/or command bus 1120 and transfer signals between one another.

Respective units as described above do not limit the scope of the present disclosure. According to one embodiment of the disclosure, the functions of the above receiving unit 1101 and determination unit 1102 may also be implemented by only one unit such as a receiving unit, and the functions of any or combination of the above receiving unit 1101 and determination unit 1102 may also be implemented by functional software in combination with the above CPU 1110, ROM 1113, RAM 1115 and/or storage unit 1117, etc.

Fourth Embodiment

The second and third embodiments are for single CW case. The fourth embodiment corresponds to handling of 2CW case. We note that single state is sufficient for rank 3-8 transmission (3-8 layer transmission). Two states might be sufficient for rank 2 transmission, because we can assume MultiUser-Multiple Input Multiple Output (MU-MIMO) among rank 2 UEs performance is similar among $n_{SCID}$ based scheme and standard transparent scheme. In that case, $n_{SCID}$ will not be signaled in DCI, but CoMP states are signaled instead. The following Table 7 can be used to indicate two states for rank 2 transmission.

TABLE 7

2CW design (allowing two state for two layer transmission, and single state for rank 5-8 transmission)
Two Codewords: Codeword 0 enabled, Codeword 1 enabled

| Value | Message |
|---|---|
| 0 | 2 layers, ports 7-8, state A ~~$n_{SCID}=0$~~ |
| 1 | 2 layers, ports 7-8, state B, ~~$n_{SCID}=1$~~ |
| 2 | 3 layers, ports 7-9, state A |
| 3 | 4 layers, ports 7-10, state A |
| 4 | 5 layers, ports 7-11, state A |
| 5 | 6 layers, ports 7-12, state A |
| 6 | 7 layers, ports 7-13, state A |
| 7 | 8 layers, ports 7-14, state A |

Figure 12:
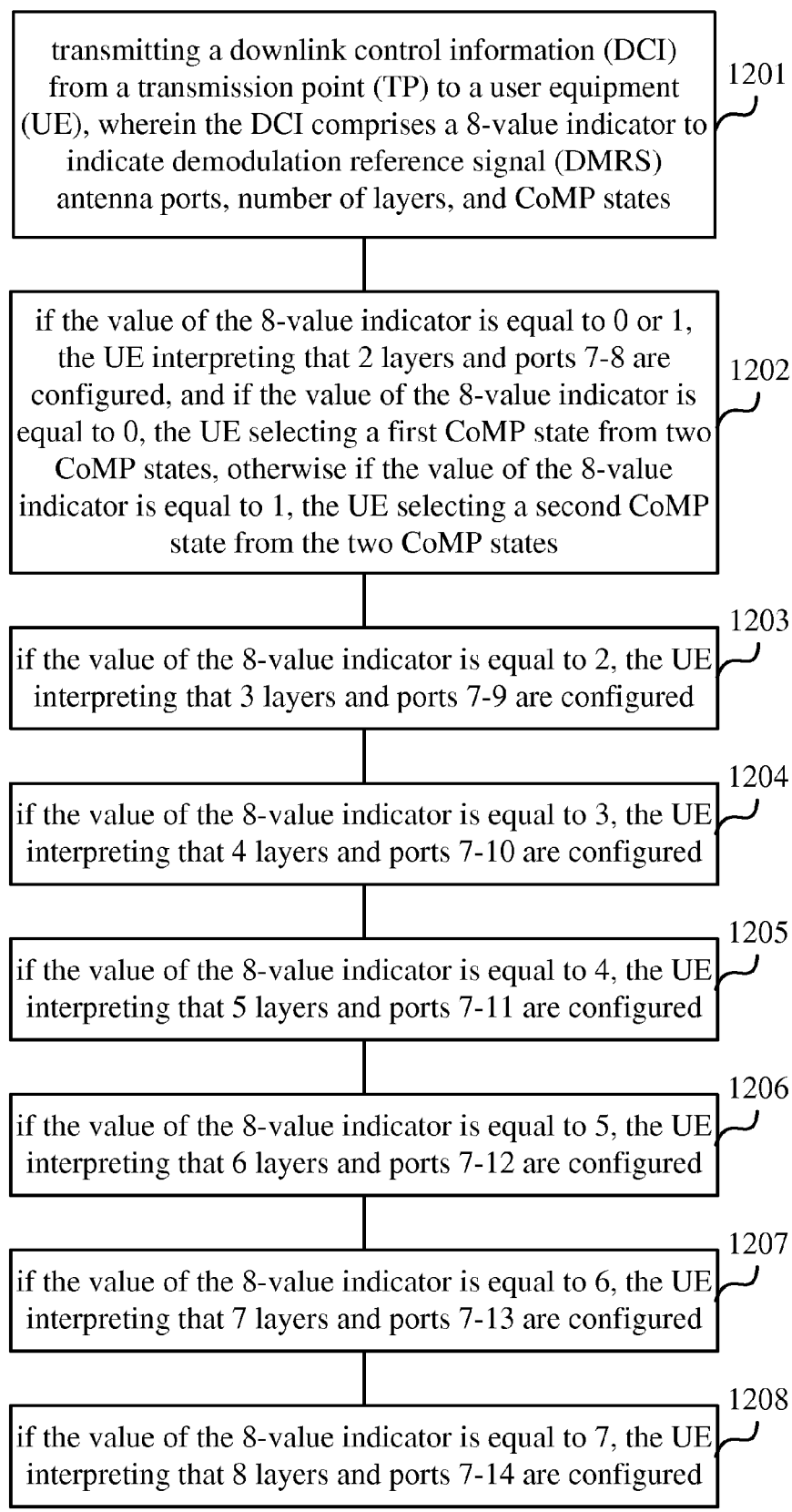
FIG. 12 illustrates a wireless communication method according to a fourth embodiment of the present disclosure.

According to the fourth embodiment, there is provided a wireless communication method of signaling coordinated multipoint (CoMP) states with both transport blocks (TB) enabled, as shown in FIG. 12, comprising: transmitting a downlink control information (DCI) from a transmission point (TP) to a user equipment (UE), wherein the DCI comprises a 8-value indicator to indicate demodulation reference signal (DMRS) antenna ports, number of layers, and CoMP states (step 1201); if the value of the 8-value indicator is equal to 0 or 1, the UE interpreting that 2 layers and ports 7-8 are configured, and if the value of the 8-value indicator is equal to 0, the UE selecting a first CoMP state from two CoMP states, otherwise if the value of the 8-value indicator is equal to 1, the UE selecting a second CoMP state from the two CoMP states (step 1202); if the value of the 8-value indicator is equal to 2, the UE interpreting that 3 layers and ports 7-9 are configured (step 1203); if the value of the 8-value indicator is equal to 3, the UE interpreting that 4 layers and ports 7-10 are configured (step 1204); if the value of the 8-value indicator is equal to 4, the UE interpreting that 5 layers and ports 7-11 are configured (step 1205); if the value of the 8-value indicator is equal to 5, the UE interpreting that 6 layers and ports 7-12 are configured (step 1206); if the value of the 8-value indicator is equal to 6, the UE interpreting that 7 layers and ports 7-13 are configured (step 1207); and if the value of the 8-value indicator is equal to 7, the UE interpreting that 8 layers and ports 7-14 are configured (step 1208).

In the above method, the CoMP state for the value of 2, 3, 4, 5, 6, or 7 can be signaled through higher layer. It is noted that in Table 7 the CoMP state for the value of 2, 3, 4, 5, 6, or 7 is represented by state A, but it is not limited to this, and it can be any appropriate state.

In addition, it is possible to configure only serving cell to rank 3-8 transmission, as in Table 8, i.e. the CoMP state for the value of 2, 3, 4, 5, 6, or 7 is fixed to be a state of serving cell.

TABLE 8

2CW design (allow two state for two layer transmission, and single state "serving cell" for rank 3-8 transmission)
Two Codewords: Codeword 0 enabled, Codeword 1 enabled

| Value | Message |
| --- | --- |
| 0 | 2 layers, ports 7-8, state A $n_{SCID}=0$, |
| 1 | 2 layers, ports 7-8, state B, $n_{SCID}=1$ |
| 2 | 3 layers, ports 7-9, serving cell |
| 3 | 4 layers, ports 7-10, serving cell |
| 4 | 5 layers, ports 7-11, serving cell |
| 5 | 6 layers, ports 7-12, serving cell |
| 6 | 7 layers, ports 7-13, serving cell |
| 7 | 8 layers, ports 7-14, serving cell |

Fifth Embodiment

The first to fourth embodiments assume the maximally up to 8 layer transmission is supported in TM10. However it is also possible to consider the case that TM10 only support up to 4 layer transmission. The system level performance loss (compared with up to 8 layer) can be acceptable because 1) rank 5-8 transmission requires UE equipped with more than 4 antenna, while there is no such product in the market at the time being, and even in the future it is also expected very few UE will have more than 4 antenna; 2) even if UE is equipped with more than 4 antenna, the UE has to be extremely close to the TP, otherwise rank 5-8 transmission is not feasible. Therefore only a small percentage of the UE can benefit from rank 5-8 transmission, and the corresponding throughput increase would be marginal from system perspective.

The fifth embodiment assumes TM10 supports up to 4 layer transmission, and considers 2CW design in this case. If only up to 4 layer is supported, value 4, 5, 6, 7 in Table 1 is not used. Then we can use those codepoints to indicate states for rank 2-4 transmission.

Figure 13:
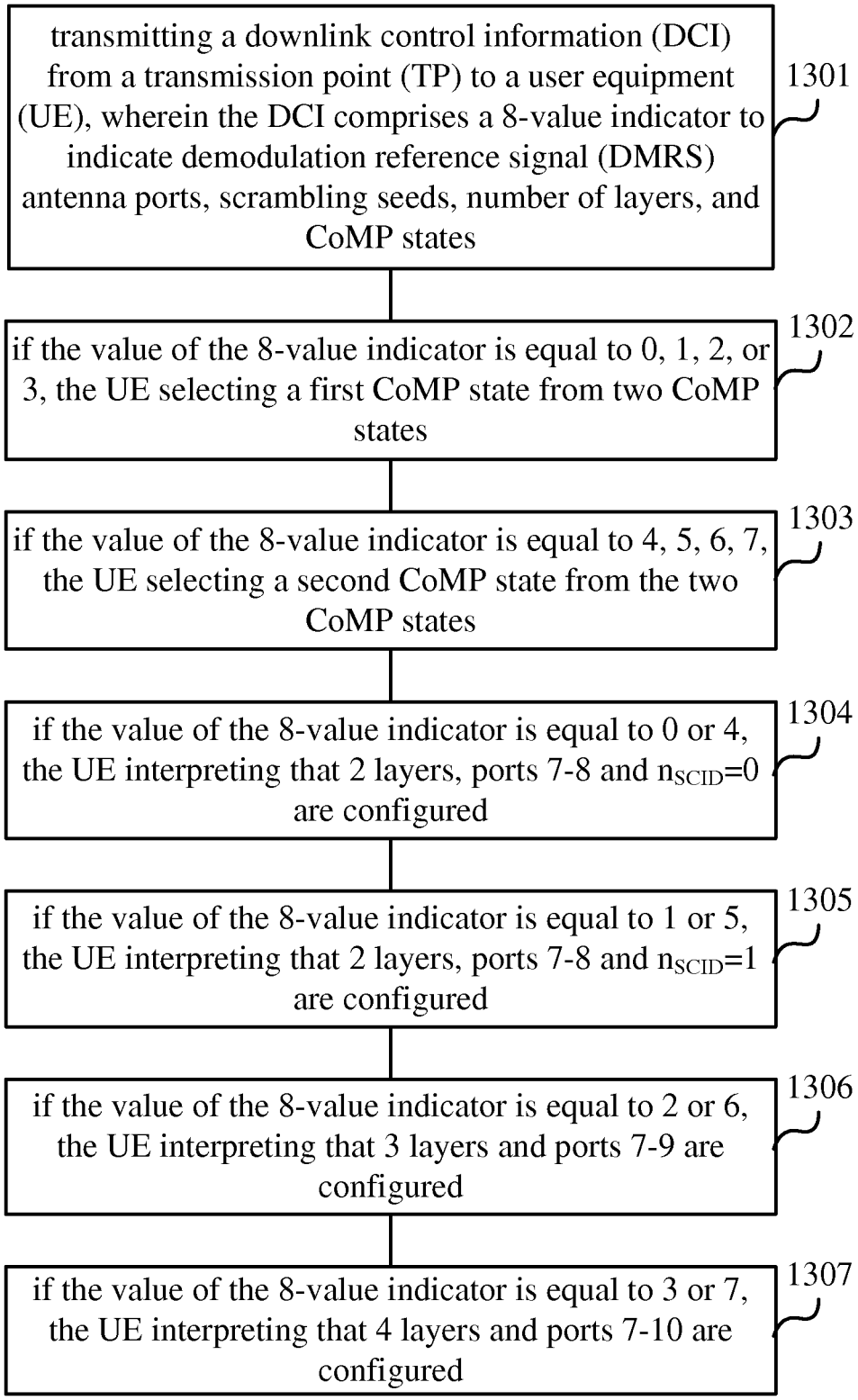
FIGS. 13-15 illustrate three wireless communication methods according to a fifth embodiment of the present disclosure, respectively.

According to a first example (as shown in Table 9) of the fifth embodiment, as shown in FIG. 13, there is provided a wireless communication method of signaling coordinated multipoint (CoMP) states with both transport blocks (TB) enabled, comprising: transmitting a downlink control information (DCI) from a transmission point (TP) to a user equipment (UE), wherein the DCI comprises a 8-value indicator to indicate demodulation reference signal (DMRS) antenna ports, scrambling identity, number of layers, and CoMP states (step 1301); if the value of the 8-value indicator is equal to 0, 1, 2, or 3, the UE selecting a first CoMP state from two CoMP states (step 1302); if the value of the 8-value indicator is equal to 4, 5, 6, 7, the UE selecting a second CoMP state from the two CoMP states (step 1303); if the value of the 8-value indicator is equal to 0 or 4, the UE interpreting that 2 layers, ports 7-8 and $n_{SCID}=0$ are configured (step 1304); if the value of the 8-value indicator is equal to 1 or 5, the UE interpreting that 2 layers, ports 7-8 and $n_{SCID}=1$ are configured (step 1305); if the value of the 8-value indicator is equal to 2 or 6, the UE interpreting that 3 layers and ports 7-9 are configured (step 1306); and if the value of the 8-value indicator is equal to 3 or 7, the UE interpreting that 4 layers and ports 7-10 are configured (step 1307).

TABLE 9

Up to 4 layer 2CW design (two states)
Two Codewords: Codeword 0 enabled, Codeword 1 enabled

| Value | Message |
| --- | --- |
| 0 | 2 layers, ports 7-8, $n_{SCID}=0$, state A |
| 1 | 2 layers, ports 7-8, $n_{SCID}=1$, state A |
| 2 | 3 layers, ports 7-9, state A |
| 3 | 4 layers, ports 7-10, state A |
| 4 | 2 layers, ports 7-8, $n_{SCID}=0$, state B |
| 5 | 2 layers, ports 7-8, $n_{SCID}=1$, state B |
| 6 | 3 layers, ports 7-9, state B |
| 7 | 4 layers, ports 7-10, state B |

Figure 14:
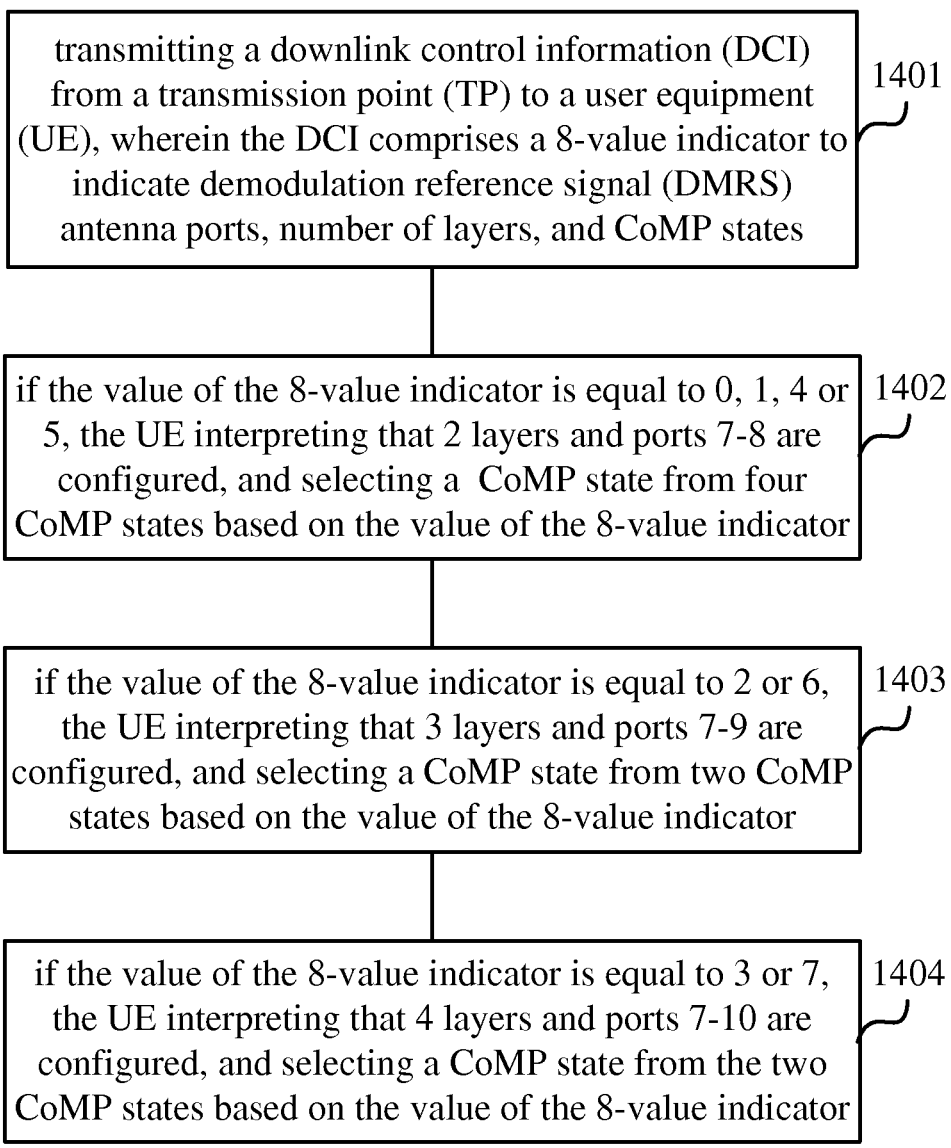

In the first example, only two states are indicated for all rank transmission. However, it is possible to configure more states for two layer transmission. According to a second example (as shown in Table 10) of the fifth embodiment, there is provided a wireless communication method of signaling coordinated multipoint (CoMP) states with both transport blocks (TB) enabled, as shown in FIG. 14, comprising: transmitting a downlink control information (DCI) from a transmission point (TP) to a user equipment (UE), wherein the DCI comprises a 8-value indicator to indicate demodulation reference signal (DMRS) antenna ports, number of layers, and CoMP states (step 1401); if the value of the 8-value indicator is equal to 0, 1, 4 or 5, the UE interpreting that 2 layers and ports 7-8 are configured, and selecting a CoMP state from four CoMP states based on the value of the 8-value indicator (step 1402); if the value of the 8-value indicator is equal to 2 or 6, the UE interpreting that 3 layers and ports 7-9 are configured, and selecting a CoMP state from two CoMP states based on the value of the 8-value indicator (step 1403); and if the value of the 8-value indicator is equal to 3 or 7, the UE interpreting that 4 layers and ports 7-10 are configured, and selecting a CoMP state from the two CoMP states based on the value of the 8-value indicator (step 1404). According to the second example, four states can be indicates for two layer transmission, and two states can be indicated for three and four layer transmission. It is noted that in Table 10, those states are represented specifically by state A, B, C, and D, however, the states can be arranged in different order from Table 10 and can also be any other appropriate sates. In particular, although the states for 3 layer and 4 layer transmission are also represented by state A and B in Table 10, they can be different states from the A or B for 2 layer transmission.

Preferably, in the above wireless communication method, if the value of the 8-value indicator is equal to 0, the UE selects a first CoMP state (e.g. state A in Table 10) from the four CoMP states (e.g. A, B, C and D); if the value of the 8-value indicator is equal to 1, the UE selects a second CoMP state (e.g. state B) from the four CoMP states; if the value of the 8-value indicator is equal to 4, the UE selects a third CoMP state (e.g. state C) from the four CoMP states; if the value of the 8-value indicator is equal to 5, the UE selects a fourth CoMP state (e.g. state D) from the four CoMP states; if the value of the 8-value indicator is equal to 2 or 6, the UE selects a fifth CoMP state (e.g. state A) from the two CoMP state (e.g. A and B); and if the value of the 8-value indicator is equal to 3 or 7, the UE selects a sixth CoMP state (e.g. state B) from the two CoMP states.

TABLE 10

Up to 4 layer 2CW design (four states for two layer, two states for rank 3-4)
Two Codewords: Codeword 0 enabled, Codeword 1 enabled

| Value | Message |
|---|---|
| 0 | 2 layers, ports 7-8, state A |
| 1 | 2 layers, ports 7-8, state B |
| 2 | 3 layers, ports 7-9, state A |
| 3 | 4 layers, ports 7-10, state A |
| 4 | 2 layers, ports 7-8, state C |
| 5 | 2 layers, ports 7-8, state D |
| 6 | 3 layers, ports 7-9, state B |
| 7 | 4 layers, ports 7-10, state B |

In the first and second examples of the fifth embodiment, $n_{SCID}$ is not included in tables 9 and 10, which may reduce MU-MIMO performance. One method to include $n_{SCID}$ is to allow only single state for rank 3-4 transmission, then there still could be three states for 2 layer transmission even with $n_{SCID}$ is included, as shown in table 11.

TABLE 11

Up to four layer 2CW design (single state for rank 3-4, and include $n_{SCID}$)

| Value | Message |
|---|---|
| 0 | 2 layers, ports 7-8, $n_{SCID}$ = 0, state A |
| 1 | 2 layers, ports 7-8, $n_{SCID}$ = 1, state A |
| 2 | 3 layers, ports 7-9, serving cell |
| 3 | 4 layers, ports 7-10, serving cell |
| 4 | 2 layers, ports 7-8, $n_{SCID}$ = 0, state B |
| 5 | 2 layers, ports 7-8, $n_{SCID}$ = 1 state B |
| 6 | 2 layers, ports 7-8 $n_{SCID}$ = 0, state C |
| 7 | 2 layers, ports 7-8, $n_{SCID}$ = 1, state C |

Figure 15:
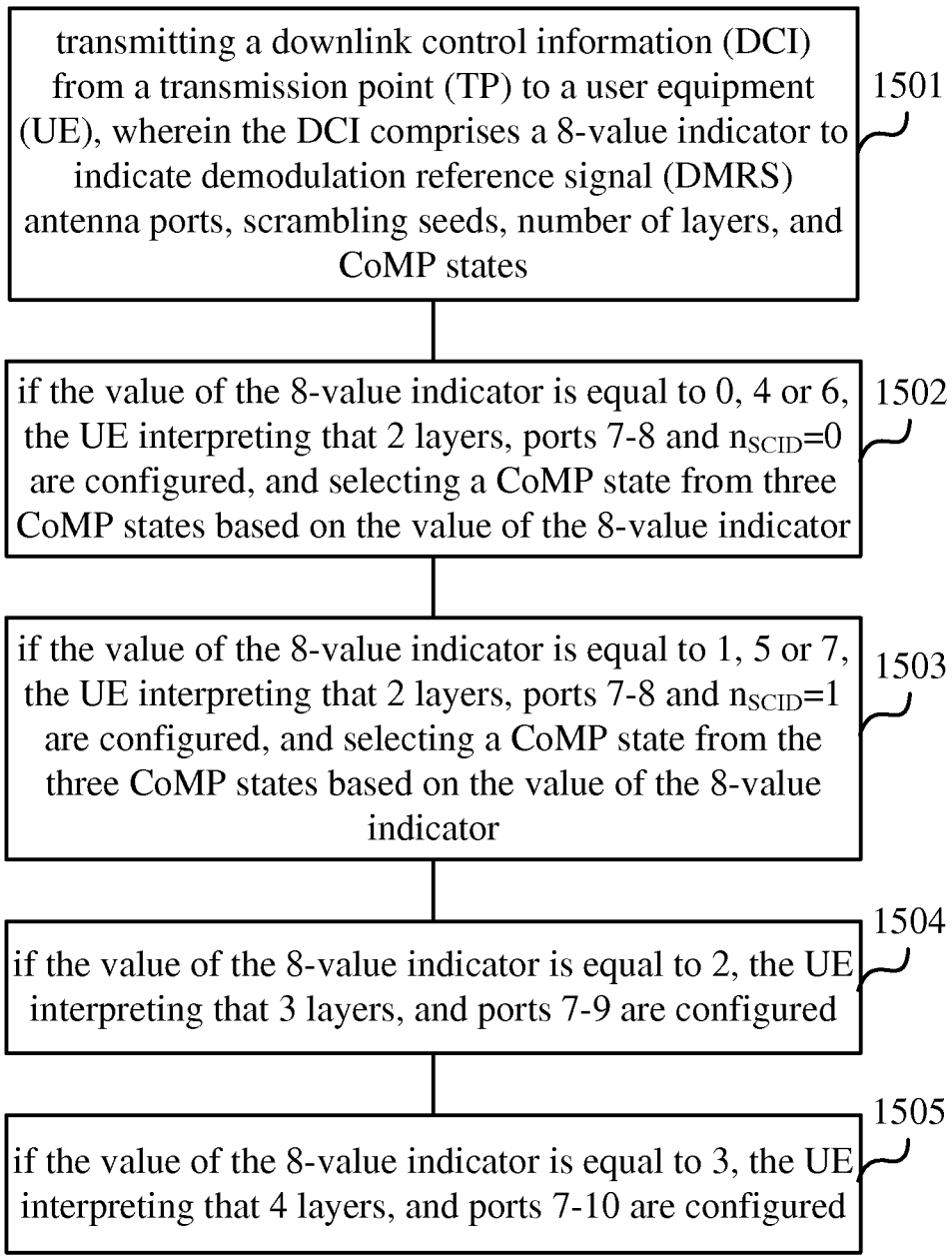

According to a third example (based on Table 11) of the fifth embodiment, there is provided a wireless communication method of signaling coordinated multipoint (CoMP) states with both transport blocks (TB) enabled, as shown in FIG. 15, comprising: transmitting a downlink control information (DCI) from a transmission point (TP) to a user equipment (UE), wherein the DCI comprises a 8-value indicator to indicate demodulation reference signal (DMRS) antenna ports, scrambling identity, number of layers, and CoMP states (step 1501); if the value of the 8-value indicator is equal to 0, 4 or 6, the UE interpreting that 2 layers, ports 7-8 and $n_{SCID}$=0 are configured, and selecting a CoMP state from three CoMP states based on the value of the 8-value indicator (step 1502); if the value of the 8-value indicator is equal to 1, 5 or 7, the UE interpreting that 2 layers, ports 7-8 and $n_{SCID}$=1 are configured, and selecting a CoMP state from the three CoMP states based on the value of the 8-value indicator (step 1503); if the value of the 8-value indicator is equal to 2, the UE interpreting that 3 layers, and ports 7-9 are configured (step 1504); and if the value of the 8-value indicator is equal to 3, the UE interpreting that 4 layers, and ports 7-10 are configured (step 1505). It is noted that for 3 and 4 layer transmission (i.e. value=2 or 3), only one CoMP state is configured and it is not necessary to be indicated in DCI. The one CoMP state can be a state of serving cell as shown in Table 11 or can be any appropriate state singled through higher layer, i.e. the CoMP state for the value of 2 or 3 is signaled through higher layer or fixed to a state of serving cell.

Sixth Embodiment

The sixth embodiment corresponds to up to 4 layer and 1CW design. First thinking is to remove value=4-7 similar to 2CW case, which enables 4 states for single layer transmission, which is shown in table 12.

TABLE 12

Up to 4 layer, 1CW case (using additional codepoints)

| Value | Message |
|---|---|
| | One Codeword: Codeword 0 enabled, Codeword 1 disabled Disabled NDI = 0 |
| 0 | 1 layer, port 7, $n_{SCID}$ = 0, state A |
| 1 | 1 layer, port 7, $n_{SCID}$ = 1, state A |
| 2 | 1 layer, port 8, $n_{SCID}$ = 0, state A |
| 3 | 1 layer, port 8, $n_{SCID}$ = 1, state A |
| 4 | 1 layer, port 7, $n_{SCID}$ = 0, state B |
| 5 | 1 layer, port 7, $n_{SCID}$ = 1, state B |
| 6 | 1 layer, port 8, $n_{SCID}$ = 0, state B |
| 7 | 1 layer, port 8, $n_{SCID}$ = 1, state B |
| | One Codeword: Codeword 0 enabled, Codeword 1 disabled Disabled NDI = 1 |
| 0 | 1 layer, port 7, $n_{SCID}$ = 0, state C |
| 1 | 1 layer, port 7, $n_{SCID}$ = 1, state C |
| 2 | 1 layer, port 8, $n_{SCID}$ = 0, state C |
| 3 | 1 layer, port 8, $n_{SCID}$ = 1, state C |
| 4 | 1 layer, port 7, $n_{SCID}$ = 0, state D |
| 5 | 1 layer, port 7, $n_{SCID}$ = 1, state D |
| 6 | 1 layer, port 8, $n_{SCID}$ = 0, state D |
| 7 | 1 layer, port 8, $n_{SCID}$ = 1, state D |

However, even if rank 5-8 layer transmission is not supported, 2 layer 1 CW transmission is still necessary for retransmission of rank 3-4 initial transmission. In that case, one codepoint in Table 12 may be selected to represent 2 layer 1 CW transmission, as shown in table 13. In Table 13, the codepoint of value=7 when disabled NDI=1 is chosen for 2 layer transmission. $n_{SCID}$ can be fixed to be 0 or 1 for that codepoint.

TABLE 13

Up to 4 layer, 1CWcase (using additional codepoints)

| Value | Message |
|---|---|
| | One Codeword: Codeword 0 enabled, Codeword 1 disabled Disabled NDI = 0 |
| 0 | 1 layer, port 7, $n_{SCID}$ = 0, state A |
| 1 | 1 layer, port 7, $n_{SCID}$ = 1, state A |
| 2 | 1 layer, port 8, $n_{SCID}$ = 0, state A |
| 3 | 1 layer, port 8, $n_{SCID}$ = 1, state A |

TABLE 13-continued

Up to 4 layer, 1CW case (using additional codepoints)

| Value | Message |
| --- | --- |
| 4 | 1 layer, port 7, $n_{SCID}$ = 0, state B |
| 5 | 1 layer, port 7, $n_{SCID}$ = 1, state B |
| 6 | 1 layer, port 8, $n_{SCID}$ = 0, state B |
| 7 | 1 layer, port 8, $n_{SCID}$ = 1, state B |
|  | One Codeword: |
|  | Codeword 0 enabled, |
|  | Codeword 1 disabled |
|  | Disabled NDI = 1 |
| 0 | 1 layer, port 7, $n_{SCID}$ = 0, state C |
| 1 | 1 layer, port 7, $n_{SCID}$ = 1, state C |
| 2 | 1 layer, port 8, $n_{SCID}$ = 0, state C |
| 3 | 1 layer, port 8, $n_{SCID}$ = 1, state C |
| 4 | 1 layer, port 7, $n_{SCID}$ = 0, state D |
| 5 | 1 layer, port 7, $n_{SCID}$ = 1, state D |
| 6 | 1 layer, port 8, $n_{SCID}$ = 0, state D |
| 7 | 2 layer, port 7-8, serving cell |

Figure 16:
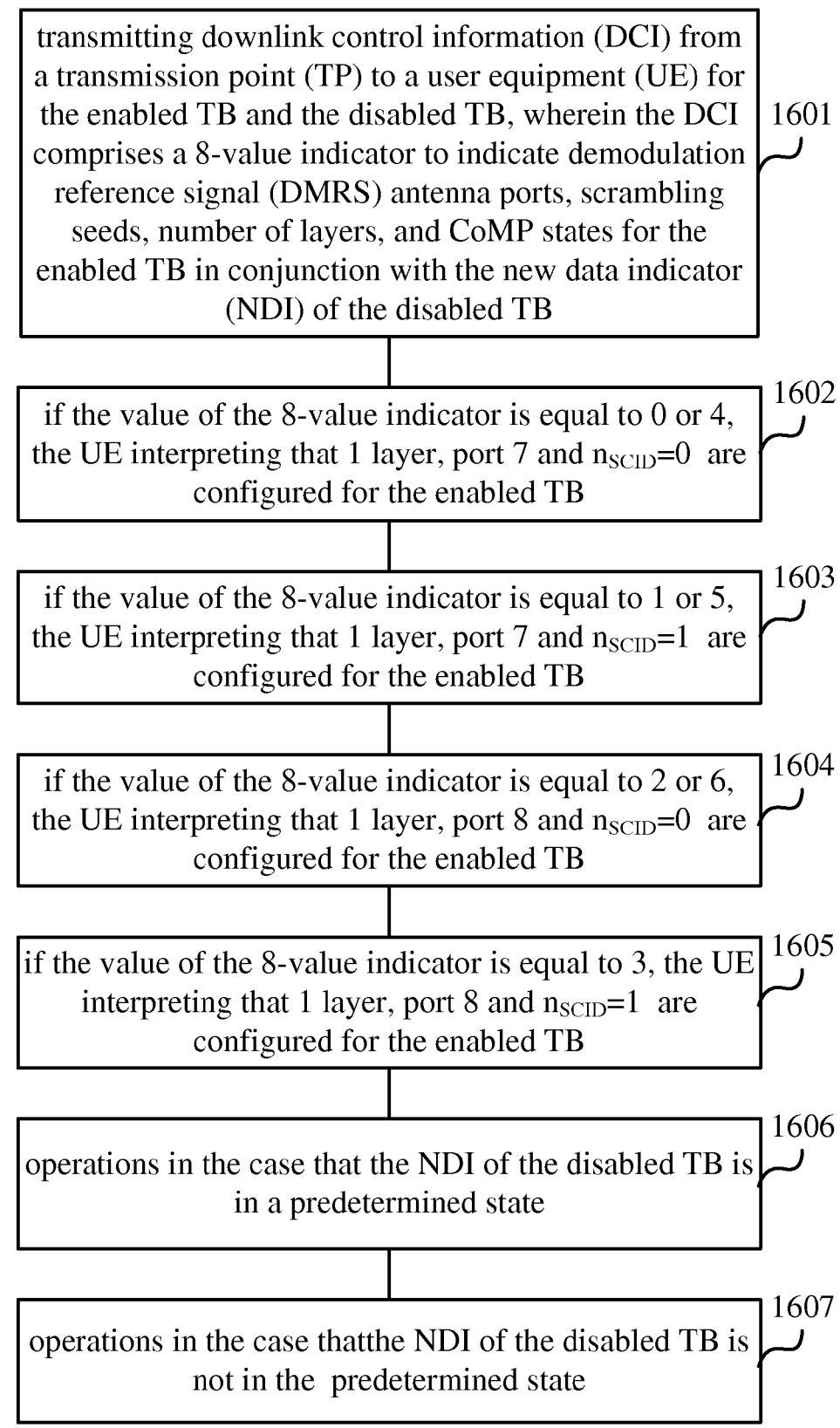
FIG. 16 illustrates a wireless communication method according to a sixth embodiment of the present disclosure.

In view of the above, according to the sixth embodiment, there is provided a wireless communication method of signaling coordinated multipoint (CoMP) states with one transport block (TB) enabled and one TB disabled, as shown in FIG. 16, comprising: transmitting downlink control information (DCI) from a transmission point (TP) to a user equipment (UE) for the enabled TB and the disabled TB, wherein the DCI comprises a 8-value indicator to indicate demodulation reference signal (DMRS) antenna ports, scrambling identity, number of layers, and CoMP states for the enabled TB in conjunction with the new data indicator (NDI) of the disabled TB (step 1601); if the value of the 8-value indicator is equal to 0 or 4, the UE interpreting that 1 layer, port 7 and $n_{SCID}$=0 are configured for the enabled TB (step 1602); if the value of the 8-value indicator is equal to 1 or 5, the UE interpreting that 1 layer, port 7 and $n_{SCID}$=1 are configured for the enabled TB (step 1603); if the value of the 8-value indicator is equal to 2 or 6, the UE interpreting that 1 layer, port 8 and $n_{SCID}$=0 are configured for the enabled TB (step 1604); if the value of the 8-value indicator is equal to 3, the UE interpreting that 1 layer, port 8 and $n_{SCID}$=1 are configured for the enabled TB (step 1605); if the NDI of the disabled TB is in a predetermined state, then if the value of the 8-value indicator is equal to 0, 1, 2, or 3, the UE selecting a first CoMP state from four CoMP states, if the value of the 8-value indicator is equal to 4, 5, 6, or 7, the UE selecting a second CoMP state from the four CoMP states, and if the value of the 8-value indicator is equal to 7, the UE interpreting that 1 layer, port 8 and $n_{SCID}$=1 are configured for the enabled TB (step 1606); and if the NDI of the disabled TB is not in the predetermined state, then if the value of the 8-value indicator is equal to 0, 1, 2, or 3, the UE selecting a third CoMP state from four CoMP states, and if the value of the 8-value indicator is equal to 4, 5, or 6, the UE selecting a fourth CoMP state from four CoMP states (step 1607).

Further, based on Table 12, the above method can further comprise: if the NDI of the disabled TB is not in the predetermined state, and the value of the 8-value indicator is equal to 7, then the UE interpreting that 1 layer, port 8 and $n_{SCID}$=1 are configured for the enabled TB, and selecting the fourth CoMP state from the four CoMP states. And, based on Table 13, the above method can further comprise: if the NDI of the disabled TB is not in the predetermined state, and the value of the 8-value indicator is equal to 7, then the UE interpreting that 2 layers and ports 7-8 are configured for the enabled TB, and the corresponding CoMP state is a state of serving cell.

It is noted that first to fourth states represented by states A to D in order in Tables 12 and 13, but it is not limited to this, the states can be in different order or be other appropriate states.

Seventh Embodiment

The fifth and sixth embodiments assume up to four layers are supported in TM10. It is also possible to assume TM10 support up to two layer transmission. In this case the cell center performance would be degraded because UE need to semi-statically switch to other TM to allow higher rank transmission, however it also enables more flexible CoMP operation because more states can be configured.

The seventh embodiment assumes up to 2 layers in TM10 and considers 2CW case. In this case four states can be configured for 2 layer transmission, in which $n_{SCID}$ is included, as shown in Table 14.

TABLE 14

Up to 2 layer, 2CW case

| Value | Message |
| --- | --- |
| 0 | 2 layers, ports 7-8, $n_{SCID}$ = 0, state A |
| 1 | 2 layers, ports 7-8, $n_{SCID}$ = 1, state A |
| 2 | 2 layers, ports 7-8, $n_{SCID}$ = 0, state B |
| 3 | 2 layers, ports 7-8, $n_{SCID}$ = 1, state B |
| 4 | 2 layers, ports 7-8, $n_{SCID}$ = 0, state C |
| 5 | 2 layers, ports 7-8, $n_{SCID}$ = 1 state C |
| 6 | 2 layers, ports 7-8 $n_{SCID}$ = 0, state D |
| 7 | 2 layers, ports 7-8, $n_{SCID}$ = 1, state D |

Figure 17:
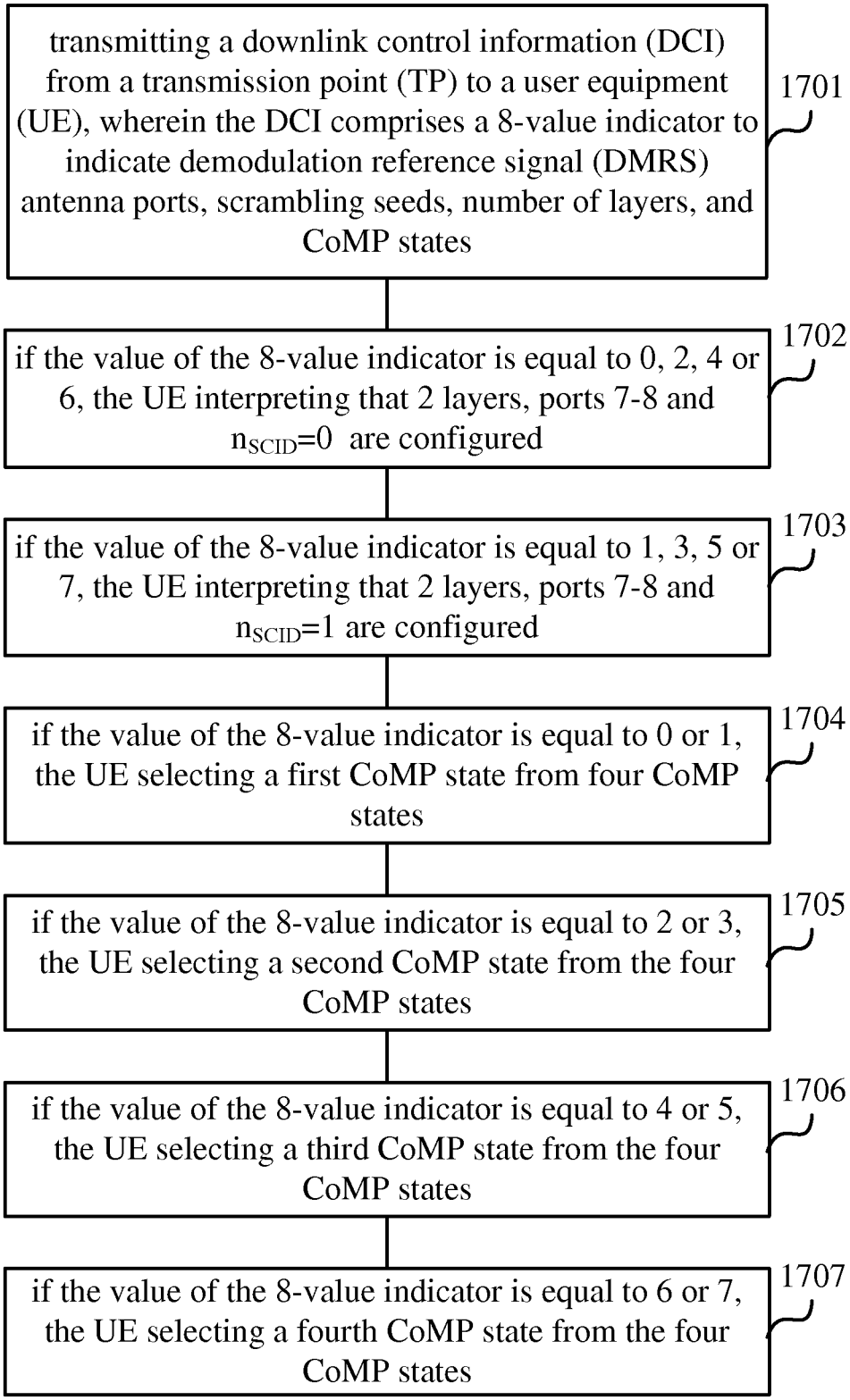
FIGS. 17 and 18 illustrate two wireless communication methods according to a seventh embodiment of the present disclosure, respectively.

According to the seventh embodiment, there is provided a wireless communication method of signaling coordinated multipoint (CoMP) states with both transport blocks (TB) enabled, as shown in FIG. 17, comprising: transmitting a downlink control information (DCI) from a transmission point (TP) to a user equipment (UE), wherein the DCI comprises a 8-value indicator to indicate demodulation reference signal (DMRS) antenna ports, scrambling identity, number of layers, and CoMP states (step 1701); if the value of the 8-value indicator is equal to 0, 2, 4 or 6, the UE interpreting that 2 layers, ports 7-8 and $n_{SCID}$=0 are configured (step 1702); if the value of the 8-value indicator is equal to 1, 3, 5 or 7, the UE interpreting that 2 layers, ports 7-8 and $n_{SCID}$=1 are configured (step 1703); if the value of the 8-value indicator is equal to 0 or 1, the UE selecting a first CoMP state from four CoMP states (step 1704); if the value of the 8-value indicator is equal to 2 or 3, the UE selecting a second CoMP state from the four CoMP states (step 1705); if the value of the 8-value indicator is equal to 4 or 5, the UE selecting a third CoMP state from the four CoMP states (step 1706); and if the value of the 8-value indicator is equal to 6 or 7, the UE selecting a fourth CoMP state from the four CoMP states (step 1707).

Figure 18:
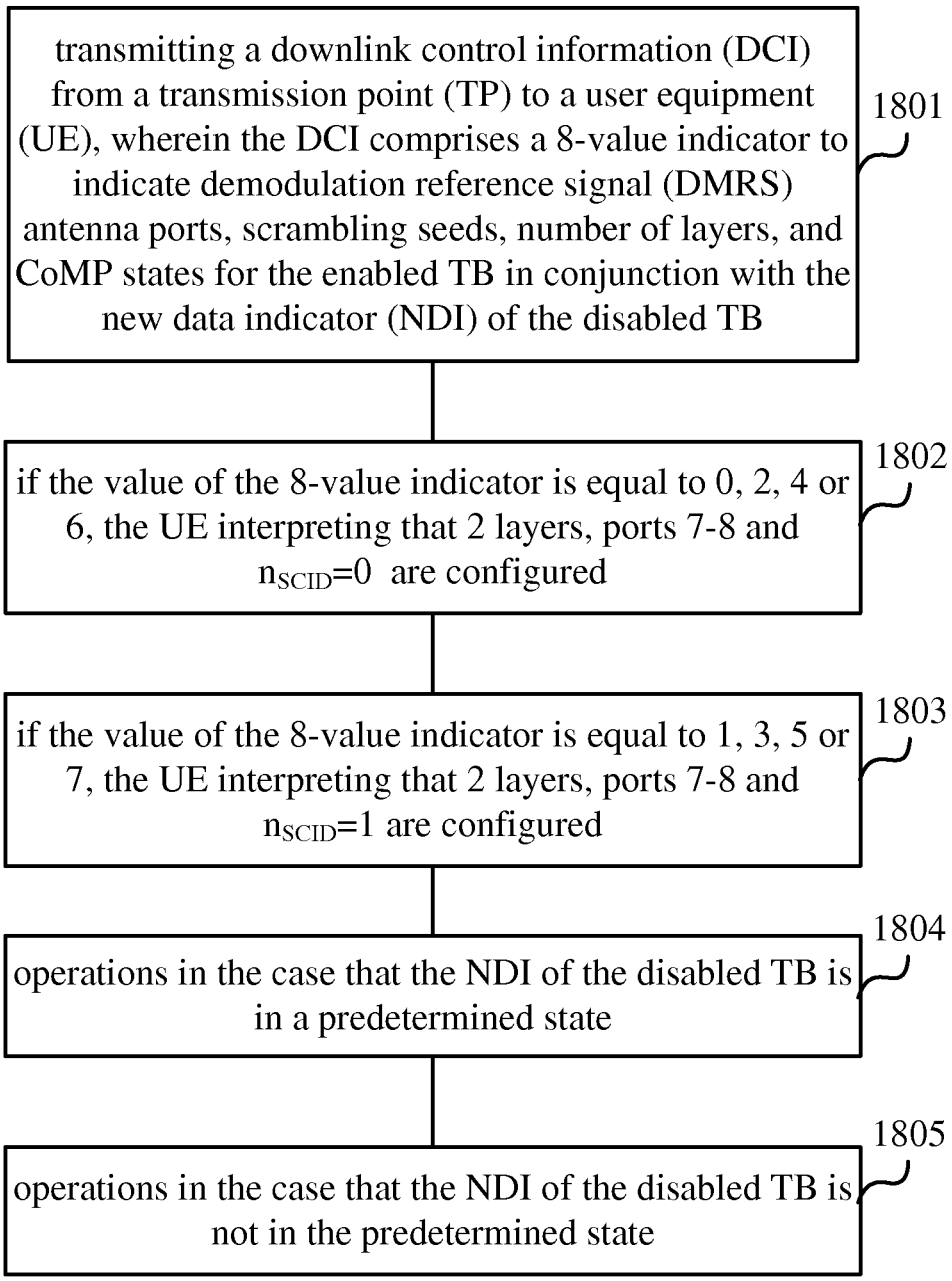

As a variation to the seventh embodiment, a 1 CW design for up to 2 layer transmission is provided. According to this variation, as shown in FIG. 18, there is provided a wireless communication method of signaling coordinated multipoint (CoMP) states with one transport block (TB) enabled and one TB disabled, comprising: transmitting a downlink control information (DCI) from a transmission point (TP) to a user equipment (UE), wherein the DCI comprises a 8-value indicator to indicate demodulation reference signal (DMRS)

antenna ports, scrambling identity, number of layers, and CoMP states for the enabled TB in conjunction with the new data indicator (NDI) of the disabled TB (step 1801); if the value of the 8-value indicator is equal to 0, 2, 4 or 6, the UE interpreting that 2 layers, ports 7-8 and $n_{SCID}=0$ are configured (step 1802); if the value of the 8-value indicator is equal to 1, 3, 5 or 7, the UE interpreting that 2 layers, ports 7-8 and $n_{SCID}=1$ are configured (step 1803); if the NDI of the disabled TB is in a predetermined state, then if the value of the 8-value indicator is equal to 0 or 1, the UE selecting a first CoMP state from four CoMP states, if the value of the 8-value indicator is equal to 2 or 3, the UE selecting a second CoMP state from the four CoMP states, if the value of the 8-value indicator is equal to 4 or 5, the UE selecting a third CoMP state from the four CoMP states, and if the value of the 8-value indicator is equal to 6 or 7, the UE selecting a fourth CoMP state from the four CoMP states (step 1804); and if the NDI of the disabled TB is not in the predetermined state, then if the value of the 8-value indicator is equal to 0 or 1, the UE selecting a fifth CoMP state from another four CoMP states, if the value of the 8-value indicator is equal to 2 or 3, the UE selecting a sixth CoMP state from said anther four CoMP states, if the value of the 8-value indicator is equal to 4 or 5, the UE selecting a seventh CoMP state from said anthor four CoMP states, and if the value of the 8-value indicator is equal to 6 or 7, the UE selecting a eighth CoMP state from said anthor four CoMP states (step 1805).

The present invention can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present invention intends to be variously changed or modified by those skilled in the art based on the description presented in the specification and known technologies without departing from the content and the scope of the present invention, and such changes and applications fall within the scope that claimed to be protected. Furthermore, in a range not departing from the content of the invention, the constituent elements of the above-described embodiments may be arbitrarily combined.

What is claimed is:

1. A wireless communication method of signaling coordinated multipoint (CoMP) states with one transport block (TB) enabled and one TB disabled, comprising:

transmitting a downlink control information (DCI) from a transmission point (TP) to a user equipment (UE) for the enabled TB and the disabled TB, wherein the DCI comprises a 8-value indicator to indicate: demodulation reference signal (DMRS) antenna ports; scrambling identity; number of layers; and CoMP states for the enabled TB in conjunction with a new data indicator (NDI) of the disabled TB;

if an NDI of the enabled TB is equal to an untoggled value or the value of the 8-value indicator for the enabled TB is equal to 0, 1, 2, or 3, the UE using an NDI of the disabled TB to select a CoMP state from a first CoMP state and a second CoMP state, the untoggled value representing that the NIA of the enabled TB is not changed with respect to the NDI of the enabled TB in a previous transmission; and if the NDI of the enabled TB is equal to a toggled value and the value of the 8-value indicator is 4, 5, 6, or 7, the UE interpreting that a single layer and a third CoMP state are configured for the enabled TB, and obtaining the information of whether the enabled TB is initial transmission or retransmission based on the NDI of the disabled TB, the toggled value representing that the NDI of the enabled TB is changed with respect to the NDI of the enabled TB in the previous transmission.

2. The wireless communication method according to claim 1, the first CoMP state, the second CoMP state, and the third CoMP state are configured through a higher layer.

3. The wireless communication method according to claim 1, wherein the NDI of the disabled TB is represented in the form of the untoggled value of 0 or the toggled value of 1, or in the form of being changed or not changed with respect to the NDI of the enabled TB in a previous transmission.

4. The wireless communication method according to claim 1, further comprising:

if the value of the 8-value indicator is equal to 0, the UE interpreting that 1 layer, port 7 and $n_{SCID}=0$ are configured for the enabled TB;

if the value of the 8-value indicator is equal to 1, the UE interpreting that 1 layer, port 7 and $n_{SCID}=1$ are configured for the enabled TB;

if the value of the 8-value indicator is equal to 2, the UE interpreting that 1 layer, port 8 and $n_{SCID}=0$ are configured for the enabled TB;

if the value of the 8-value indicator is equal to 3, the UE interpreting that 1 layer, port 8 and $n_{SCID}=1$ are configured for the enabled TB;

if the NDI of the enabled TB is equal to the untoggled value, then if the value of the 8-value indicator is equal to 4, the UE interpreting that 2 layers and ports 7-8 are configured for the enabled TB;

if the value of the 8-value indicator is equal to 5, the UE interpreting that 3 layers and ports 7-9 are configured for the enabled TB;

if the value of the 8-value indicator is equal to 6, the UE interpreting that 4 layers and ports 7-10 are configured for the enabled TB; and if the value of the 8-value indicator is equal to 7, the UE interpreting that the value of 7 is reserved; and if the NDI of the enabled TB is equal to the toggled value, then if the value of the 8-value indicator is equal to 4, the UE interpreting that 1 layer, port 7 and nSCID=0 are configured for the enabled TB;

if the value of the 8-value indicator is equal to 5, the UE interpreting that 1 layer, port 7 and nSCID=1 are configured for the enabled TB;

if the value of the 8-value indicator is equal to 6, the UE interpreting that 1 layer, port 8 and nSCID=0 are configured for the enabled TB; and if the value of the 8-value indicator is equal to 7, the UE interpreting that 1 layer, port 8 and $n_{SCID}$=1 are configured for the enabled TB.

5. The wireless communication method according to claim 1, wherein different sets of the first CoMP state, the second CoMP state, and the third CoMP state are configured for the case that the enabled TB is the first mapped TB and for the case that the enabled TB is the second mapped TB, respectively.

6. A wireless communication method of signaling coordinated multipoint (CoMP) states with one transport block (TB) enabled and one TB disabled, comprising:

transmitting a downlink control information (DCI) from a transmission point (TP) to a user equipment (UE) for the enabled TB and the disabled TB, wherein the DCI comprises a 8-value indicator to indicate: demodulation reference signal (DMRS) antenna ports; scrambling identity; number of layers; and CoMP states for the enabled TB in conjunction with a new data indicator (NDI) of the disabled TB;

if the value of the 8-value indicator for the enabled TB is equal to 0, 1, 2, or 3, the UE using the NDI of the disabled TB to select a CoMP state from a first CoMP state and a second CoMP state; and if the value of the 8-value indicator is 4, 5, 6, or 7 and the NDI of the disabled TB indicates a predetermined CoMP state, the UE interpreting that a single layer and a third CoMP state are configured for the enabled TB, wherein if the value of the 8-value indicator is equal to 0, the UE interpreting that 1 layer, 7 and $n_{SCID}$=0 are configured for the enabled TB;

if the value of the 8-value indicator is equal to 1, the UE interpreting that 1 layer, port 7 $n_{SCID}$=1 are configured for the enabled TB;

if the value of the 8-value indicator is equal to 2, the UE interpreting that 1 layer, port 8 and $n_{SCID}$=0 are configured for the enabled TB;

if the value of the 8-value indicator is equal to 3, the UE interpreting that 1 layer, port 8 and $n_{SCID}$=1 are configured for the enabled TB;

if the NDI of the disabled TB does not indicate the predetermined CoMP state, then if the value of the 8-value indicator is equal to 4, the UE interpreting that 2 layers and ports 7-8 are configured for the enabled TB;

if the value of the 8-value indicator is equal to 5, the UE interpreting that 3 layers and ports 7-9 are configured for the enabled TB;

if the value of the 8-value indicator is equal to 6, the UE interpreting that 4 layers and ports 7-10 are configured for the enabled TB; and if the value of the 8-value indicator is equal to 7, the UE interpreting that the value of 7 is reserved; and if the NDI of the disabled TB indicates the predetermined CoMP state, then if the value of the 8-value indicator is equal to 4, the UE interpreting that 1 layer, port 7 and $n_{SCID}$=0 are configured for the enabled TB;

if the value of the 8-value indicator is equal to 5, the UE interpreting that 1 layer, port 7 and nSCID=1 are configured for the enabled TB;

if the value of the 8-value indicator is equal to 6, the UE interpreting that 1 layer, port 8 and nSCID=0 are configured for the enabled TB; and if the value of the 8-value indicator is equal to 7, the UE interpreting that 1 layer, port 8 and $n_{SCID}$=1 are configured for the enabled TB.

7. The wireless communication method according to claim 6, wherein if the NDI of the disabled TB does not indicate the predetermined CoMP state, the CoMP state for the value of 4, 5, 6, or 7 is signaled through a higher layer.

8. The wireless communication method according to claim 6, wherein if the NDI of the disabled TB does not indicate the predetermined CoMP state, the CoMP state for the value of 4, 5, 6, or 7 is fixed to be a state of serving cell.

9. The wireless communication method according to claim 6, wherein the first CoMP state or the second CoMP state is defined to be a state of serving cell.

10. The wireless communication method according to claim 6, wherein the first CoMP state, the second CoMP state, and the third CoMP state are configured through a higher layer.

11. The wireless communication method according to claim 6, the predetermined CoMP state is that the NDI of the disabled TB is equal to 1.

12. The wireless communication method according to claim 6, wherein different sets of the first CoMP state, the second CoMP state, and the third CoMP state are configured for the case that the enabled TB is the first mapped TB and for the case that the enabled TB is the second mapped TB, respectively.

13. A transmission point (TP) for signaling coordinated multipoint (CoMP) states with one transport block (TB) enabled and one TB disabled, comprising:

a transmission unit configured to transmit a downlink control information (DCI) to a user equipment (UE) for the enabled TB and the disabled TB, wherein the DCI comprises a 8-value indicator to indicate: demodulation reference signal (DMRS) antenna ports; scrambling identity; number of layers; and CoMP states for the enabled TB in conjunction with a new data indicator (NDI) of the disabled TB; and a configuration unit configured to:

set a value of the NDI of the disabled TB to indicate whether a CoMP state is a first CoMP state or a second CoMP state if an NDI of the enabled TB is equal to an untoggled value or the value of the 8-value indicator for the enabled TB is equal to 0, 1, 2, or 3, the untoggled value representing that the NDI of the enabled TB is not changed with respect to the NDI of the enabled TB in a previous transmission; and configure a single layer and a third CoMP state for the enabled TB and set a value of the NDI of the disabled TB to indicate whether the enabled TB is initial transmission or retransmission, if the NDI of the enabled TB is equal to a toggled value and the value of the 8-value indicator is 4, 5, 6, or 7, the toggled value representing that the NDI of the enabled TB is changed with respect to the NDI of the enabled TB in the previous transmission.

14. A user equipment (UE) for determining coordinated multipoint (CoMP) states with one transport block (TB) enabled and one TB disabled, comprising:

a receiving unit configured to receive a downlink control information (DCI) from a transmission point (TP) for the enabled TB and the disabled TB, wherein the DCI comprises a 8-value indicator to indicate: demodulation reference signal (DMRS) antenna ports; scrambling identity; number of layers; and CoMP states for the enabled TB in conjunction with a new data indicator (NDI) of the disabled TB; and a determination unit configured to:
  use the NDI of the disabled TB to select a CoMP state from a first CoMP state and a second CoMP state if an NDI of the enabled TB is equal to an untoggled value or the value of the 8-value indicator for the enabled TB is equal to 0, 1, 2, or 3, the untoggled value representing that the NDI of the enabled TB is not changed with respect to the NDI of the enable TB in a previous transmission; and
  interpret that a single layer and a third CoMP state are configured for the enabled TB and obtain the information of whether the enabled TB is initial transmission or retransmission based on the NDI of the disabled TB, if the NDI of the enabled TB is equal to a toggled value and the value of the 8-value indicator is 4, 5, 6, or 7, the toggled value representing that the NDI of the enabled TB is changed with respect to the NDI of the enabled TB in the previous transmission.

\* \* \* \* \*